United States Patent
Suto et al.

(10) Patent No.: US 11,568,890 B2
(45) Date of Patent: Jan. 31, 2023

(54) MAGNETIC RECORDING DEVICE AND MAGNETIC RECORDING METHOD UTILIZING ASSISTED MAGNETIC RECORDING

(71) Applicants: KABUSHIKI KAISHA TOSHIBA, Tokyo (JP); TOSHIBA ELECTRONIC DEVICES & STORAGE CORPORATION, Tokyo (JP)

(72) Inventors: Hirofumi Suto, Ota (JP); Tazumi Nagasawa, Yokohama (JP); Masayuki Takagishi, Kunitachi (JP); Naoyuki Narita, Funabashi (JP); Tomoyuki Maeda, Kawasaki (JP); Hitoshi Iwasaki, Nerima (JP)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 0 days.

(21) Appl. No.: 17/393,674

(22) Filed: Aug. 4, 2021

(65) Prior Publication Data
US 2022/0157336 A1 May 19, 2022

(30) Foreign Application Priority Data
Nov. 17, 2020 (JP) ............................. JP2020-190702

(51) Int. Cl.
*G11B 5/31* (2006.01)
*G11B 5/245* (2006.01)
(Continued)

(52) U.S. Cl.
CPC ............ *G11B 5/2455* (2013.01); *G11B 5/012* (2013.01); *G11B 5/187* (2013.01); *G11B 5/23* (2013.01);
(Continued)

(58) Field of Classification Search
None
See application file for complete search history.

(56) References Cited

U.S. PATENT DOCUMENTS 6,785,092 B2 * 8/2004 Covington ............ G11B 5/3133
360/125.58
8,953,273 B1 * 2/2015 Funayama ............. G11B 5/012
360/68
(Continued)

FOREIGN PATENT DOCUMENTS

| JP | 4649519 B2 | 3/2011 |
| JP | 4818426 B2 | 11/2011 |
| JP | 2018-147540 A | 9/2018 |

OTHER PUBLICATIONS

Zhu, J. et al. "Microwave Assisted Magnetic Recording Utilizing Perpendicular Spin Torque Oscillator With Switchable Perpendicular Electrodes" IEEE Transactions on Magnetics, vol. 46, No. 3, Mar. 2010, pp. 751-757.

*Primary Examiner* — Jefferson A Evans
(74) *Attorney, Agent, or Firm* — Oblon, McClelland, Maier & Neustadt, L.L.P.

(57) ABSTRACT

According to one embodiment, a magnetic recording device for utilizing assisted magnetic recording includes a magnetic head, a first circuit, a second circuit, a third circuit, and a controller. The magnetic head includes a first magnetic pole, a second magnetic pole, a magnetic element, and a coil. The magnetic element is located between the first magnetic pole and the second magnetic pole. The magnetic element includes a first magnetic layer. The first circuit is configured to supply a coil current to the coil. The second circuit is configured to supply an element current to the magnetic element. The third circuit is configured to detect an electrical resistance of the magnetic element. The controller is configured to control the element current by controlling the (Continued)

second circuit based on the electrical resistance detected by the third circuit.

12 Claims, 11 Drawing Sheets

(51) Int. Cl.
  *G11B 5/012* (2006.01)
  *G11B 5/23* (2006.01)
  *G11B 5/187* (2006.01)

(52) U.S. Cl.
  CPC .......... *G11B 5/3133* (2013.01); *G11B 5/3146* (2013.01)

(56) References Cited

U.S. PATENT DOCUMENTS

| | | |
|---|---|---|
| 10,424,323 B1 * | 9/2019 | Contreras ............... G11B 5/314 |
| 10,762,916 B1 * | 9/2020 | Wu ......................... G11B 5/012 |
| 10,891,975 B1 * | 1/2021 | Bai ....................... G11B 5/1278 |
| 10,997,993 B1 * | 5/2021 | Freitag ................. G11B 5/3912 |
| 2010/0232053 A1 | 9/2010 | Yano et al. |
| 2011/0128648 A1 | 6/2011 | Ezawa et al. |
| 2013/0335847 A1 * | 12/2013 | Shiroishi ................ G11B 5/607 |
| | | 360/59 |
| 2018/0261241 A1 | 9/2018 | Narita et al. |
| 2019/0279661 A1 * | 9/2019 | Poss .......................... G11B 5/09 |
| 2020/0211585 A1 * | 7/2020 | Koizumi ................... G11B 5/09 |
| 2020/0279584 A1 * | 9/2020 | Tomoda ............... G11B 21/083 |
| 2020/0349969 A1 * | 11/2020 | Contreras ............ G11B 5/3912 |
| 2021/0272597 A1 * | 9/2021 | Okada ...................... G11B 5/82 |
| 2022/0066649 A1 * | 3/2022 | Isokawa ................ G06F 3/0659 |

* cited by examiner

MAGNETIC RECORDING DEVICE AND MAGNETIC RECORDING METHOD UTILIZING ASSISTED MAGNETIC RECORDING

CROSS-REFERENCE TO RELATED APPLICATIONS

This application is based upon and claims the benefit of priority from Japanese Patent Application No. 2020-190702, filed on Nov. 17, 2020; the entire contents of which are incorporated herein by reference.

FIELD

Embodiments described herein relate generally to a magnetic recording device and a magnetic recording method.

BACKGROUND

Information is recorded in a magnetic recording medium such as a HDD (Hard Disk Drive) or the like by using a magnetic head. It is desirable to improve the recording capacity of the magnetic recording device.

DETAILED DESCRIPTION

Figure 1:
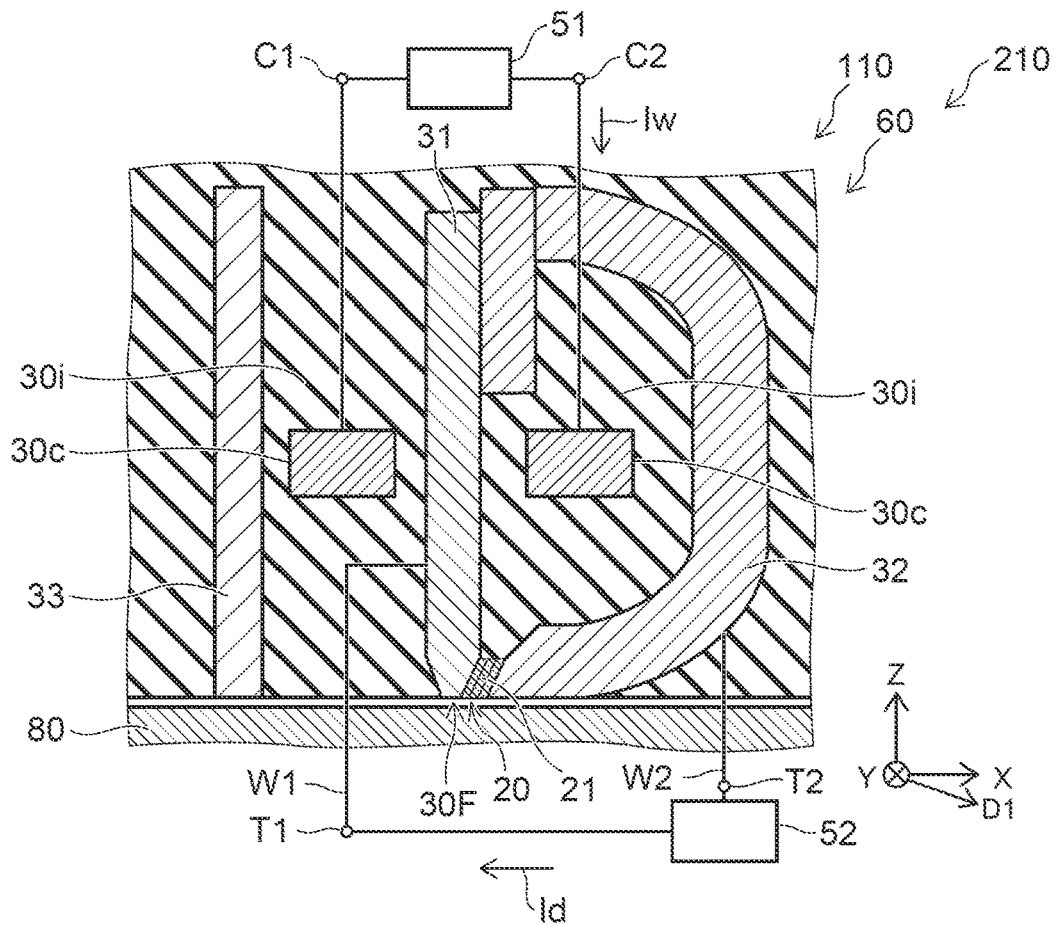
FIG. 1 is a schematic cross-sectional view illustrating a magnetic recording device according to a first embodiment.

According to one embodiment, a magnetic recording device includes a magnetic head, a first circuit, a second circuit, a third circuit, and a controller. The magnetic head includes a first magnetic pole, a second magnetic pole, a magnetic element, and a coil. The magnetic element is located between the first magnetic pole and the second magnetic pole. The magnetic element includes a first magnetic layer. The first circuit is configured to supply a coil current to the coil. The second circuit is configured to supply an element current to the magnetic element. The third circuit is configured to detect an electrical resistance of the magnetic element. The controller is configured to control the element current by controlling the second circuit based on the electrical resistance detected by the third circuit.

According to one embodiment, a magnetic recording device includes a magnetic head, a first circuit, and a second circuit. The magnetic head includes a first magnetic pole, a second magnetic pole, a magnetic element, and a coil. The magnetic element is located between the first magnetic pole and the second magnetic pole. The magnetic element includes a first magnetic layer, a first magnetic pole-side nonmagnetic layer located between the first magnetic pole and the first magnetic layer, and a second magnetic pole-side nonmagnetic layer located between the first magnetic layer and the second magnetic pole. The first magnetic pole-side nonmagnetic layer includes one of a first material or a second material. The second magnetic pole-side nonmagnetic layer includes the other of the first material or the second material. The first material includes at least one selected from the group consisting of Ta, Pt, W, Ir, Mo, Cr, Tb, Mn, and Ni. The second material includes at least one selected from the group consisting of Cu, Ag, Au, Cr, and Ru. The first circuit is configured to supply a coil current to the coil. The second circuit is configured to supply an element current to the magnetic element. A polarity of the coil current changes at a first time. The second circuit sets the element current to a first value before a second time. The second circuit changes the element current to a second value at the second time. The second value is different from the first value. The second circuit changes the element current to the first value at a third timed after the second time.

According to one embodiment, a magnetic recording device includes a magnetic head, a first circuit, and a second circuit. The magnetic head includes a first magnetic pole, a second magnetic pole, a magnetic element, and a coil. The magnetic element is located between the first magnetic pole and the second magnetic pole. The magnetic element includes a first magnetic layer, a second magnetic layer located between the first magnetic layer and the first magnetic pole, a first nonmagnetic layer located between the first magnetic layer and the second magnetic layer, a first magnetic pole-side nonmagnetic layer located between the first magnetic pole and the second magnetic layer, and a second magnetic pole-side nonmagnetic layer located between the first magnetic layer and the second magnetic pole. The first circuit is configured to supply a coil current to the coil. The second circuit is configured to supply an element current to the magnetic element. A polarity of the coil current changes at a first time. The second circuit sets the element current to a first value before a second time. The second circuit changes the element current to a second value at the second time. The second value is different from the first value. The second circuit changes the element current to the first value at a third time after the second time. The second circuit changes the element current to a third value at a fourth time before the second time. The third value is different from the first value and different from the second value. The second circuit changes the element current toward the second value at a fifth time after the fourth time and at or before the second time.

Various embodiments are described below with reference to the accompanying drawings.

The drawings are schematic and conceptual; and the relationships between the thickness and width of portions, the proportions of sizes among portions, etc., are not necessarily the same as the actual values. The dimensions and proportions may be illustrated differently among drawings, even for identical portions.

In the specification and drawings, components similar to those described previously or illustrated in an antecedent drawing are marked with like reference numerals, and a detailed description is omitted as appropriate.

First Embodiment

FIG. 1 is a schematic cross-sectional view illustrating a magnetic recording device according to a first embodiment.

Figure 2:
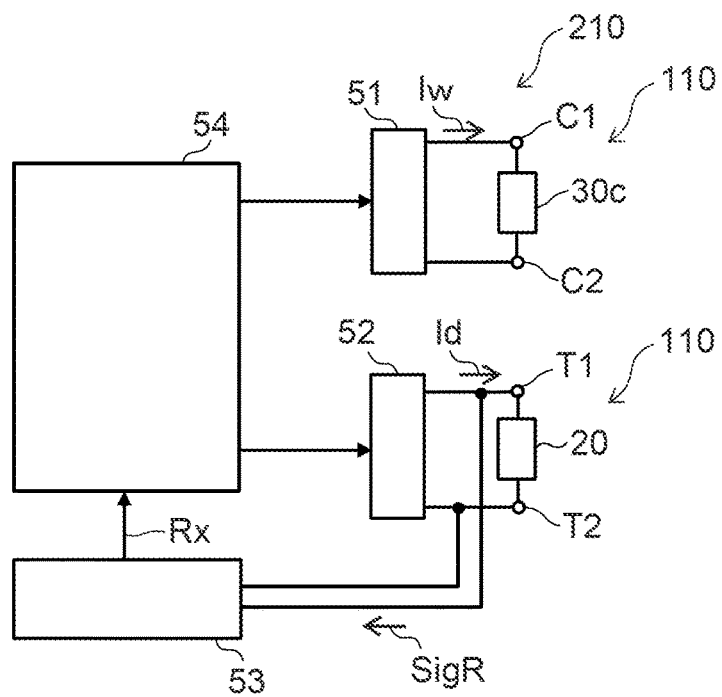
FIG. 2 is a schematic view illustrating the magnetic recording device according to the first embodiment.

FIG. 2 is a schematic view illustrating the magnetic recording device according to the first embodiment.

As shown in FIGS. 1 and 2, the magnetic recording device 210 according to the embodiment includes a magnetic head 110, a first circuit 51, a second circuit 52, a third circuit 53, and a controller 54.

As shown in FIG. 1, the magnetic head 110 includes a first magnetic pole 31, a second magnetic pole 32, a magnetic element 20, and a coil 30c.

As shown in FIG. 1, the magnetic head 110 also may include a shield 33. The first magnetic pole 31, the second magnetic pole 32, the magnetic element 20, the coil 30c, and the shield 33 are included in a recording part 60. As described below, the magnetic head 110 may include a reproducing part.

The first magnetic pole 31 is located between the shield 33 and the second magnetic pole 32. For example, at least a portion of the coil 30c is located between the first magnetic pole 31 and the second magnetic pole 32. In the example, a portion of the coil 30c is located between the shield 33 and the first magnetic pole 31.

The first circuit 51 is electrically connected to the coil 30c. The first circuit 51 is configured to supply a coil current Iw to the coil 30c. In a recording operation, the coil current Iw is, for example, a recording current. A magnetic field (a recording magnetic field) that corresponds to the recording current is generated from the first magnetic pole 31. The recording magnetic field is applied to a magnetic recording medium 80; and information is recorded in the magnetic recording medium 80. Thus, the first circuit 51 is configured to supply, to the coil 30c, a recording current that corresponds to the information to be recorded. For example, the magnetic recording medium 80 is a perpendicular magnetic recording medium.

As shown in FIG. 1, a first coil terminal C1 and a second coil terminal C2 may be provided. These terminals are electrically connected with the coil 30c. For example, the first circuit 51 supplies the coil current Iw (e.g., the recording current) to the coil 30c via these terminals.

As shown in FIG. 1, the magnetic element 20 is located between the first magnetic pole 31 and the second magnetic pole 32. The magnetic element 20 includes a first magnetic layer 21.

As shown in FIG. 1, for example, an insulating part 30i is located around the first magnetic pole 31, the second magnetic pole 32, the shield 33, the coil 30c, and the magnetic element 20.

The first magnetic pole 31 is, for example, a major magnetic pole. A magnetic pole surface 30F is located at the end portion of the first magnetic pole 31. For example, the magnetic pole surface 30F is along an ABS (Air Bearing Surface) of the magnetic head 110. The magnetic pole surface 30F faces the magnetic recording medium 80.

A direction perpendicular to the magnetic pole surface 30F is taken as a Z-axis direction. One direction perpendicular to the Z-axis direction is taken as an X-axis direction. A direction perpendicular to the Z-axis direction and the X-axis direction is taken as a Y-axis direction.

The Z-axis direction is, for example, the height direction. The X-axis direction is, for example, the down-track direction. The Y-axis direction is the cross-track direction.

For example, the second magnetic pole 32 is separated from the first magnetic pole 31 along the X-axis direction at the vicinity of the magnetic pole surface 30F. The magnetic head 110 and the magnetic recording medium 80 relatively move substantially along the X-axis direction. Thereby, information is recorded at any position of the magnetic recording medium 80.

For example, the second magnetic pole 32 corresponds to a "trailing shield". For example, the shield 33 corresponds to a "leading shield". The second magnetic pole 32 is, for example, an auxiliary magnetic pole. The second magnetic pole 32 can form a magnetic core with the first magnetic pole 31. For example, an additional shield such as a side shield (not illustrated), etc., may be included.

As shown in FIG. 1, the second circuit 52 is configured to supply an element current Id to the magnetic element 20.

For example, the magnetic element 20 may be electrically connected with the first and second magnetic poles 31 and 32. In such a case, the element current Id may be supplied to the magnetic element 20 via the first and second magnetic poles 31 and 32.

First wiring W1 and second wiring W2 may be included as shown in FIG. 1. The first wiring W1 is electrically connected with the first magnetic pole 31. The second wiring W2 is electrically connected with the second magnetic pole 32. A first terminal T1 and a second terminal T2 may be included. The first terminal T1 is electrically connected with the first magnetic pole 31 via the first wiring W1. The second terminal T2 is electrically connected with the second magnetic pole 32 via the second wiring W2.

For example, the element current Id is supplied to the first and second magnetic poles 31 and 32 from the second circuit 52 via the first terminal T1, the first wiring W1, the second wiring W2, and the second terminal T2.

According to the embodiment, by the element current Id flowing in the magnetic element 20, the magnetic field that is emitted from the first magnetic pole 31 can be efficiently oriented toward the magnetic recording medium 80. For example, by the element current Id, the orientation of the magnetization of the first magnetic layer 21 is reversed with respect to the magnetic field emitted from the first magnetic pole 31. The magnetic field that is emitted from the first magnetic pole 31 does not easily pass through the first magnetic layer 21. As a result, the magnetic field is easily oriented toward the magnetic recording medium 80. Thereby, the magnetic field is efficiently applied to the magnetic recording medium 80. The recording density can be increased by such an operation.

As described below, the magnetic element 20 may include a second magnetic layer. In such a case, for example, the magnetic element 20 is caused to oscillate by supplying the element current Id to the magnetic element 20. The magnetic element 20 functions as an STO (Spin Torque Oscillator). An alternating current magnetic field (e.g., a high frequency magnetic field) is generated from the magnetic element 20 according to the oscillation. The alternating current magnetic field that is generated by the magnetic element 20 is applied to the magnetic recording medium 80; and the recording to the magnetic recording medium 80 is assisted. For example, MAMR (Microwave Assisted Magnetic Recording) can be performed. In such a case as well, the recording density can be increased.

The third circuit 53 (referring to FIG. 2) is configured to detect the electrical resistance of the magnetic element 20. For example, the third circuit 53 is electrically connected with the first and second terminals T1 and T2. The third circuit 53 may be configured to detect at least one of the electrical resistance of the magnetic element 20 or the change of the electrical resistance of the magnetic element 20 via at least a portion of the second circuit 52. The third circuit 53 detects an electrical signal SigR obtained from the magnetic element 20. The third circuit 53 can detect the electrical resistance of the magnetic element 20 from the electrical signal SigR.

In one example as described above, by the element current Id, the orientation of the magnetization of the first magnetic layer 21 is reversed with respect to the magnetic field emitted from the first magnetic pole 31. Accordingly, the electrical resistance of the magnetic element 20 changes. In another example, for example, the magnetization of the first magnetic layer 21 oscillates due to the element current Id. The electrical resistance of the magnetic element 20 is changed by the element current Id. Information that relates to the magnetic state of the magnetic element 20 is obtained by detecting the electrical resistance (or the change of the electrical resistance). For example, the state of the reversal of the magnetization of the magnetic element 20 can be ascertained. For example, the state of the oscillation of the magnetization of the magnetic element 20 can be ascertained.

The controller 54 is configured to control the element current Id by controlling the second circuit 52 based on the electrical resistance detected by the third circuit 53.

For example, the controller 54 controls the element current Id to increase the electrical resistance. For example, the electrical resistance of the magnetic element 20 when the magnetization of the magnetic element 20 is reversed becomes greater than the electrical resistance before the magnetization of the magnetic element 20 was reversed. For example, the magnitude of the reversal of the magnetization with respect to the magnetic field of the recording magnetic field in the magnetic element 20 is high when the electrical resistance is highest. For example, the recording magnetic field can be efficiently oriented toward the magnetic recording medium 80 when the electrical resistance is highest. The recording density can be increased thereby. A magnetic recording device can be provided in which the recording capacity can be improved.

As shown in FIG. 2, the third circuit 53 (e.g., the detection circuit) acquires the electrical signal SigR from the magnetic element 20 and detects the electrical resistance based on the electrical signal SigR. An electrical resistance Rx that is detected is supplied to the controller 54. The controller 54 controls the element current Id by controlling the second circuit 52 based on the electrical resistance Rx. As described below, for example, the electrical signal SigR that is detected by the third circuit 53 temporally changes according to the temporal change of the coil current Iw. The electrical resistance Rx may be the average of the electrical resistance corresponding to the temporally-changing electrical signal SigR.

An example of the coil current Iw and the element current Id will now be described.

FIGS. 3A to 3D are schematic views illustrating an operation of the magnetic recording device according to the first embodiment.

Figure 3A:
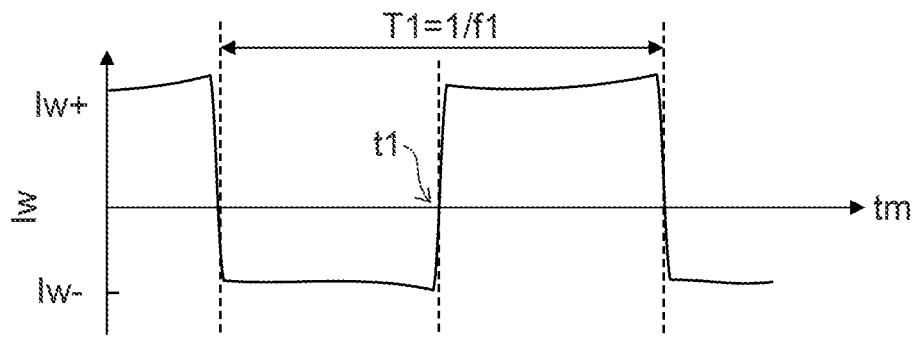
FIGS. 3A to 3D are schematic views illustrating an operation of the magnetic recording device according to the first embodiment.
Figure 3B:
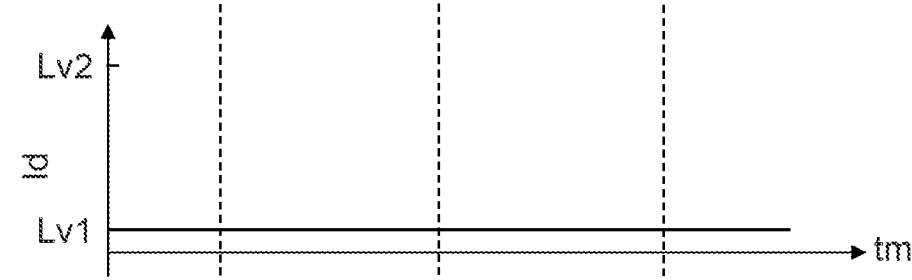
Figure 3C:
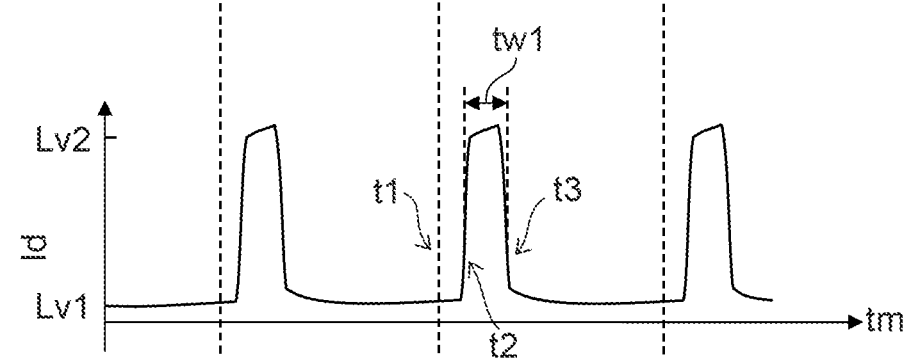
Figure 3D:
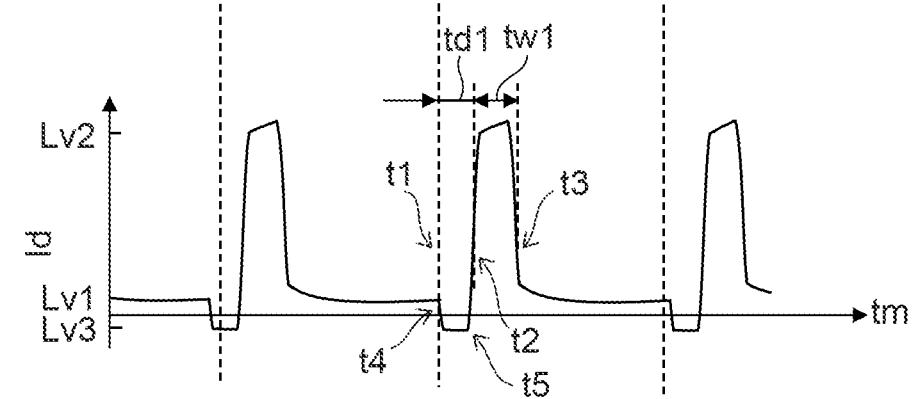

In these figures, the horizontal axis is a time tm. The vertical axis of FIG. 3A is the coil current Iw. In FIGS. 3B to 3D, the vertical axis is the element current Id. An example of one operation (a first operation) performed by the magnetic recording device 210 will now be described. As described above, the coil current Iw is controlled by the first circuit 51; and the element current Id is controlled by the second circuit 52.

As shown in FIG. 3A, the polarity of the coil current Iw changes at a first time t1. For example, the coil current Iw is an alternating current. In the example, the alternating current includes a first frequency f1. For example, the coil current Iw changes between a current Iw− and a current Iw+.

In one example as shown in FIG. 3B, the element current Id has a first value Lv1. The first value Lv1 is positive. For example, when the first value Lv1 is large, the change of the magnetization is faster, and a high performance is easily obtained. When the first value Lv1 is excessively large, the magnetic element 20 is easily damaged. For example, when the element current Id is constant at the first value Lv1, an "upper limit" is set so that a stable magnetic element 20 can be maintained. The controller 54 may be configured to control the first value Lv1 of the element current Id by controlling the second circuit 52 based on the electrical resistance Rx detected by the third circuit 53. In such a case, the first value Lv1 is set to be not more than the "upper limit" recited above.

In one example as shown in FIG. 3C, the second circuit 52 sets the element current Id to the first value Lv1 before a second time t2. The second circuit 52 changes the element current Id to a second value Lv2 at the second time t2. The second value Lv2 is different from the first value Lv1. In the example shown in FIG. 3B, the second time t2 is after the first time t1. The second circuit 52 changes the element current Id to the first value Lv1 at a third time t3 after the second time t2.

For example, the second time t2 may be a time when the element current Id practically becomes an intermediate value between the value (the first value Lv1) before the change and the value (the second value Lv2) after the change. The third time t3 may be a time when the element current Id becomes an intermediate value between the value (the second value Lv2) before the change and the value (the first value Lv1) after the change.

When the element current Id has such a waveform, in the first operation, the controller 54 can control at least one of the second time t2, the third time t3, the first value Lv1, or the second value Lv2 by controlling the second circuit 52 based on the electrical resistance Rx detected by the third circuit 53.

In the operation described above, the temporal average of the element current Id is set to be not more than the set "upper limit" recited above when the element current Id is constant (e.g., the example of FIG. 3B). The temporal average of the element current Id corresponds to "the time proportion that the element current Id has the first value Lv1"×Lv1+"the time proportion that the element current Id has the second value Lv2"×Lv2. The first value Lv1 of FIG. 3B, the first value Lv1 of FIG. 3C, and the first value Lv1 of FIG. 3D may be different from each other. The second value Lv2 of FIG. 3C and the second value Lv2 of FIG. 3D may be different from each other.

The second time t2 is, for example, a time that is referenced to the first time t1. The third time t3 may be, for example, a time that is referenced to the first time t1. The third time t3 may be, for example, a time that is referenced to the second time t2.

For example, the controller 54 controls at least one of the second time t2, the third time t3, the first value Lv1, or the second value Lv2 to increase the electrical resistance Rx based on the detected electrical resistance Rx. For example, the magnetization of the magnetic element 20 is effectively reversed thereby. Or, for example, the magnetization of the magnetic element 20 effectively oscillates. For example, the recording magnetic field effectively acts on the magnetic recording medium 80. A high recording density is obtained.

In the example shown in FIG. 3C as well, the second circuit 52 sets the element current Id to the first value Lv1 before the second time t2, changes the element current Id to the second value Lv2 at the second time t2, and changes the element current Id to the first value Lv1 at the third time t3. As shown in FIG. 3C, the second circuit 52 further changes the element current Id to a third value Lv3 at a fourth time t4 before the second time t2. The third value Lv3 is different from the first value Lv1 and different from the second value Lv2. The second circuit 52 starts to change the element current Id toward the second value Lv2 at a fifth time t5 that is after the fourth time t4 and at or before the second time t2.

For example, the controller 54 controls at least one of the second time t2, the third time t3, the fourth time t4, the fifth time t5, the first value Lv1, the second value Lv2, or the third value Lv3 to increase the electrical resistance Rx based on the detected electrical resistance Rx. For example, magnetization of the magnetic element 20 is effectively reversed thereby. Or, for example, the magnetization of the magnetic element 20 effectively oscillates. For example, the recording magnetic field effectively acts on the magnetic recording medium 80. A high recording density is obtained.

In the operation described above, the temporal average of the element current Id is set to be not more than the set "upper limit" recited above when the element current Id is constant (e.g., the example of FIG. 3B). The temporal average of the element current Id corresponds to "the time proportion that the element current Id has the first value Lv1"דthe absolute value of Lv1"+"the time proportion that the element current Id has the second value Lv2"דthe absolute value of Lv2"+"the time proportion that the element current Id has the third value Lv3"דthe absolute value ofדLv3".

An example of the electrical signal SigR obtained from the magnetic element 20 will now be described.

Figure 4A:
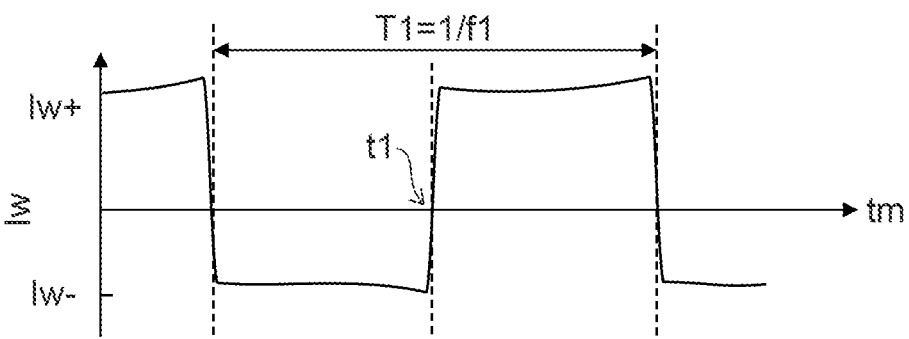
FIGS. 4A and 4B are schematic views illustrating an operation of the magnetic recording device according to the first embodiment.
Figure 4B:
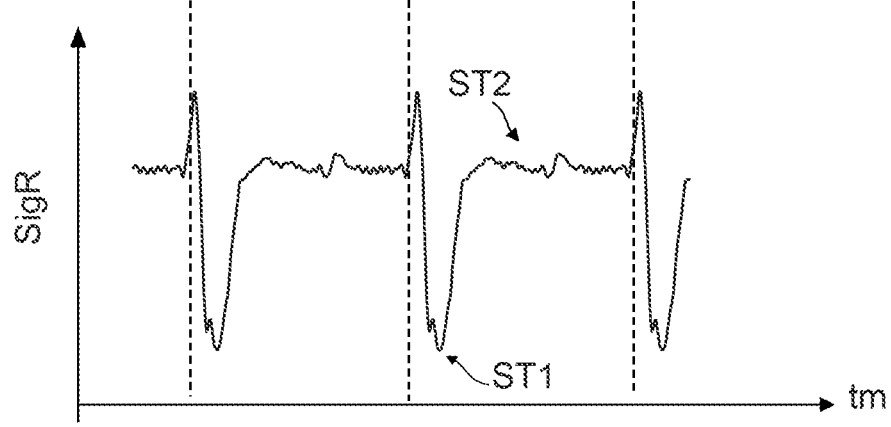

FIGS. 4A and 4B are schematic views illustrating an operation of the magnetic recording device according to the first embodiment.

FIG. 4A illustrates the coil current Iw. FIG. 4B illustrates the electrical signal SigR obtained from the magnetic element 20. The electrical signal SigR corresponds to the electrical resistance of the magnetic element 20. In these figures, the horizontal axis is the time tm. The vertical axis of FIG. 4A is the coil current Iw. The vertical axis of FIG. 4B is the electrical signal SigR obtained from the magnetic element 20.

As shown in FIG. 4A, for example, the coil current Iw is an alternating current that includes the first frequency f1. As shown in FIG. 4B, the electrical signal SigR includes a second frequency that is 2 times the first frequency f1.

In the characteristic illustrated in FIG. 4B, a state ST1 in which the electrical signal SigR is relatively low corresponds to the state before the magnetization of the magnetic element 20 reverses. A state ST2 in which the electrical signal SigR is relatively high corresponds to the state in which the magnetization of the magnetic element 20 has reversed. For example, the state ST1 quickly transitions to the state ST2 when the magnetization of the magnetic element 20 is reversed in a short period of time. As described above, the controller 54 controls the second circuit 52 based on the electrical resistance Rx detected by the third circuit 53. For example, the electrical resistance Rx corresponds to the temporal average of the electrical signal SigR. For example, the electrical signal SigR illustrated in FIG. 4B may be summed, and the electrical resistance Rx may correspond to the average value.

The controller 54 controls at least one of the second time t2, the third time t3, the first value Lv1, or the second value Lv2 to increase the electrical resistance Rx based on such an electrical resistance Rx. It was found that in the magnetic recording device 210, a high electrical resistance Rx is easily obtained by using the element current Id that includes the first value Lv1, the second value Lv2, and the third value Lv3 such as those described above. Examples of the change of the electrical resistance of the magnetic element 20 will now be described.

FIGS. 5A to 5E are schematic views illustrating operations of the magnetic recording device according to the first embodiment.

Figure 5A:
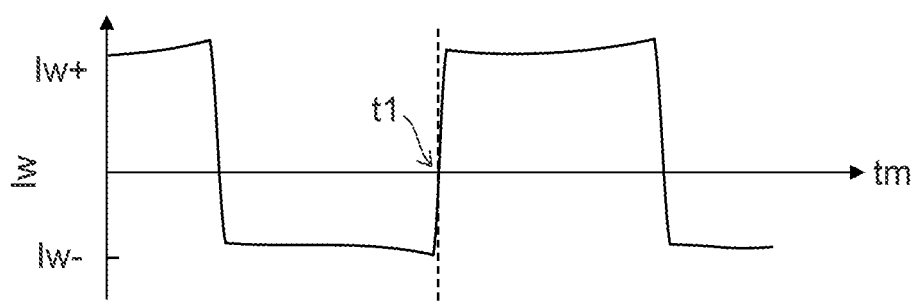
FIGS. 5A to 5E are schematic views illustrating operations of the magnetic recording device according to the first embodiment.
Figure 5B:
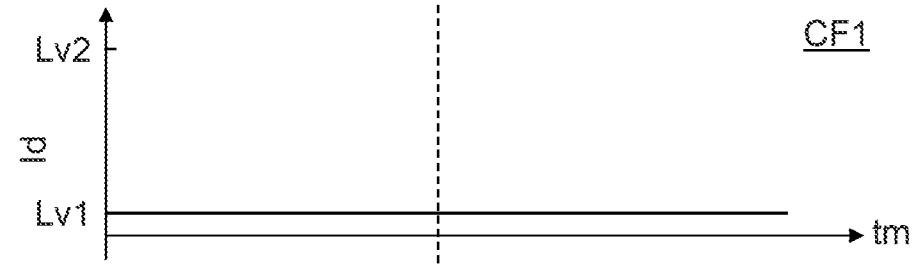

In these figures, the horizontal axis is the time tm. FIG. 5A is the coil current Iw. The polarity of the coil current Iw changes at the first time t1. FIG. 5B illustrates the element current Id of a first configuration CF1. As shown in FIG. 5B, the element current Id constantly has the first value Lv1 in the first configuration CF1.

Figure 5C:
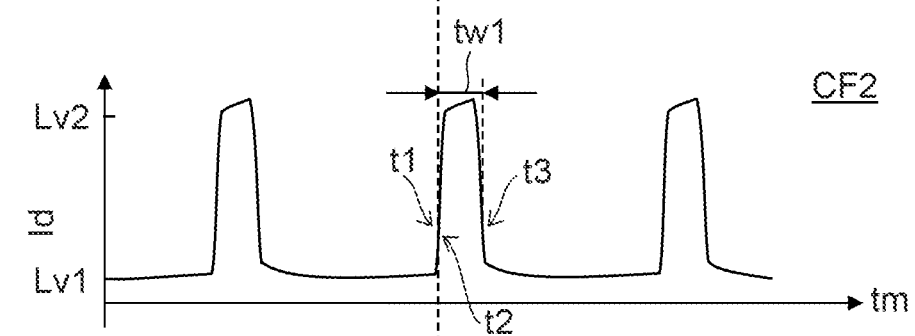

FIG. 5C illustrates the element current Id of a second configuration CF2. As shown in FIG. 5C, the difference between the first time t1 and the second time t2 is 0 in the second configuration CF2. In the second configuration CF2, the difference (i.e., a duration tw1) between the second time t2 and the third time t3 is 0.4 ns.

Figure 5D:
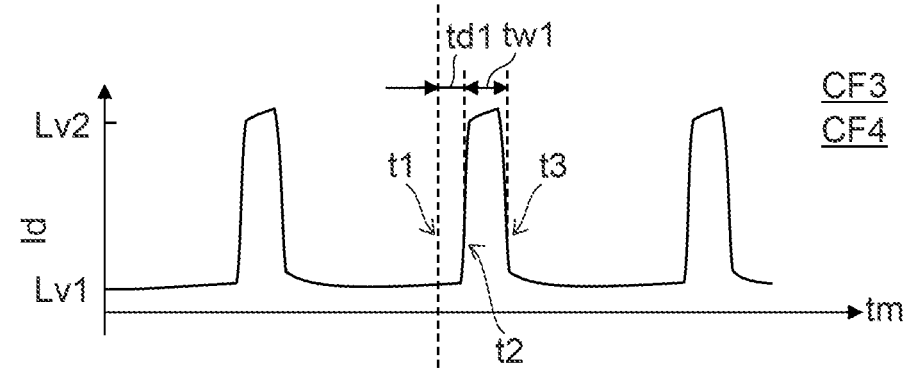

FIG. 5D illustrates the element current Id of a third configuration CF3 and a fourth configuration CF4. As shown in FIG. 5D, the second time t2 is after the first time t1 in the third and fourth configurations CF3 and CF4. The difference (a time difference td1) between the first time t1 and the second time t2 is 0.2 ns in the third configuration CF3. The difference (the time difference td1) between the first time t1 and the second time t2 is 0.4 ns in the fourth configuration CF4. The difference (i.e., the duration tw1) between second time t2 and the third time t3 is 0.4 ns in the third and fourth configurations CF3 and CF4.

Figure 5E:
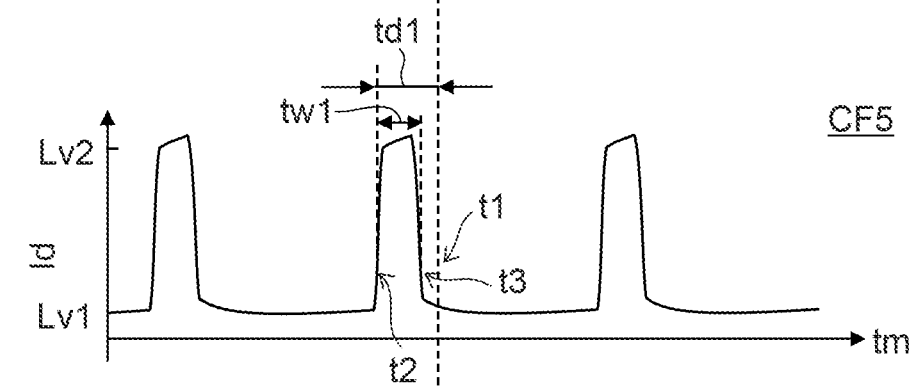

FIG. 5E illustrates the element current Id of a fifth configuration CF5. As shown in FIG. 5E, the second time t2 is before the first time t1 in the fifth configuration CF5. The difference (the time difference td1) between the first time t1 and the second time t2 is −0.2 ns in the fifth configuration CF5. The difference (i.e., the duration tw1) between the second time t2 and the third time t3 is 0.4 ns in the fifth configuration CF5. For the same temporal average of the element current Id, the first value Lv1 of FIG. 5B is different from the first value Lv1 of FIGS. 5C to 5E.

The electrical resistance Rx is evaluated for such first to fifth configurations CF1 to CF5. In the evaluation, the average value (the temporal average) of the element current Id is modified. The modification of the average value of the element current Id is performed by modifying the first value Lv1 and the second value Lv2.

Figure 6:
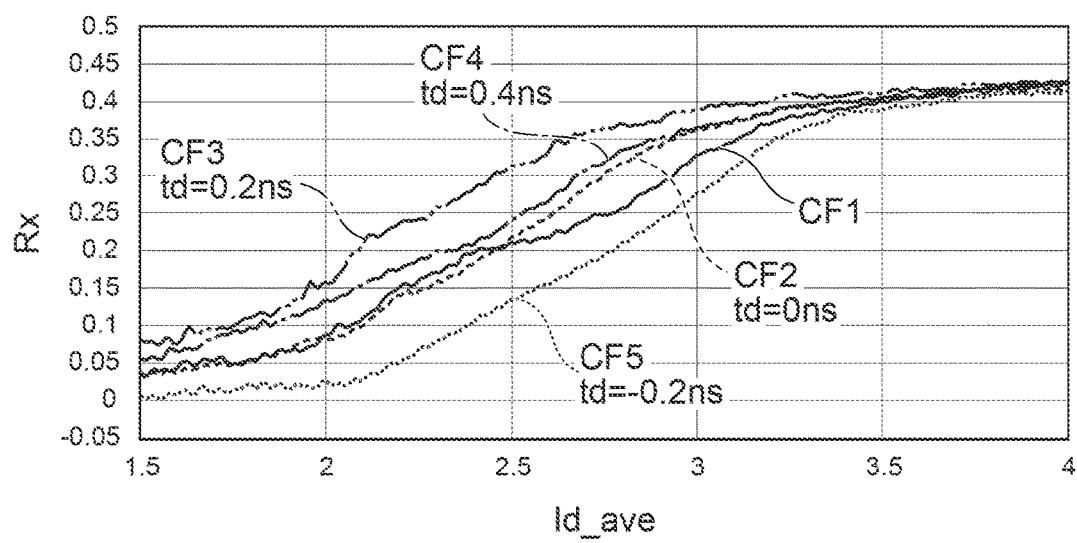
FIG. 6 is a graph illustrating characteristics of the magnetic recording device according to the first embodiment.

FIG. 6 is a graph illustrating characteristics of the magnetic recording device according to the first embodiment.

In FIG. 6, the horizontal axis is an average value Id_ave of the element current Id. The vertical axis is the electrical resistance Rx of the magnetic element 20. The electrical resistance Rx corresponds to the temporal average value of the electrical signal SigR that changes over time. A high electrical resistance Rx in FIG. 6 means that the magnetization effectively changes (e.g., reverses).

For the same average value Id_ave of the element current Id as shown in FIG. 6, the electrical resistances Rx of the third and fourth configurations CF3 and CF4 are greater than the electrical resistances Rx of the other configurations. When the average value Id_ave is relatively large, the electrical resistance Rx of the second configuration CF2 is greater than the electrical resistance Rx of the first configuration CF1. The electrical resistance Rx of the fifth configuration CF5 is less than the electrical resistance Rx of the first configuration CF1.

It is considered that the high electrical resistances Rx that are obtained in the third and fourth configurations CF3 and CF4 are related to the reversal of the magnetization of the magnetic element 20 being faster due to increasing the element current Id directly after the reversal of the magnetic pole is caused by the reversal of the coil current Iw.

Thus, a high electrical resistance Rx is obtained by controlling the waveform of the element current Id. By the controller 54 appropriately controlling the element current Id, a higher electrical resistance Rx is obtained, and more effective control of magnetization is possible. By the controller 54 controlling at least one of the second time t2, the third time t3, the first value Lv1, or the second value Lv2, more effective control of the magnetization is possible.

According to the embodiment, it is favorable for the time difference td1 to be positive. It is favorable for the second time t2 to be after the first time t1 in a time period that is ½ of the period of the coil current Iw. It is favorable for the difference between the first time t1 and the second time to be, for example, not less than 0.1 ns and not more than 1 ns.

In the waveform illustrated in FIG. 3C as well, the electrical resistance Rx changes according to the conditions of the element current Id. By the controller 54 appropriately controlling the element current Id, a higher electrical resistance Rx is obtained, and more effective control of the magnetization is possible. By the controller 54 controlling at least one of the second time t2, the third time t3, the fourth time t4, the fifth time t5, the first value Lv1, the second value Lv2, or the third value Lv3, more effective control of the magnetization is possible.

According to the embodiment, for example, the time that the element current Id has the first value Lv1 is greater than the time that the element current Id has the second value Lv2 in the time period that is ½ of the period of the coil current Iw. The magnetization is more effectively changed by the second value Lv2 that has a short pulse form. The time that the element current Id has the first value Lv1 is greater than the time that the element current Id has the third value Lv3 in the time period that is ½ of the period of the coil current Iw. The magnetization is more effectively changed by the third value Lv3 that has a short pulse form.

Figure 7A:
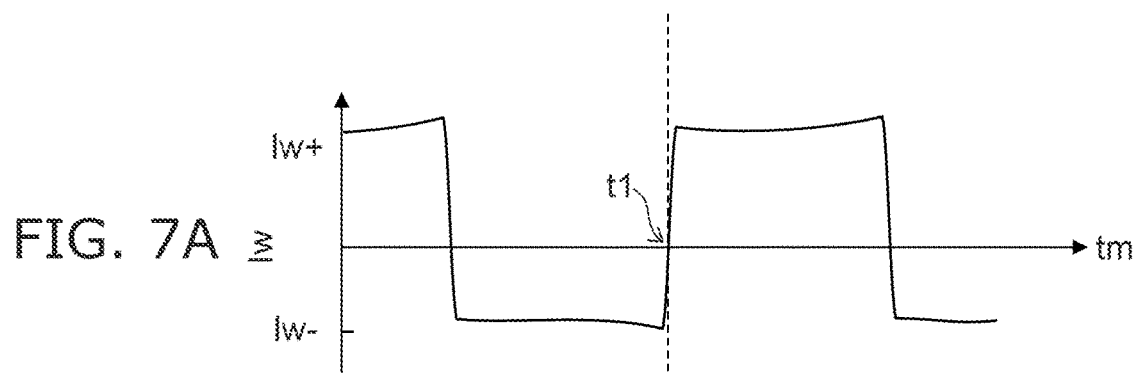
FIGS. 7A and 7B are schematic views illustrating an operation of the magnetic recording device according to the first embodiment.
Figure 7B:
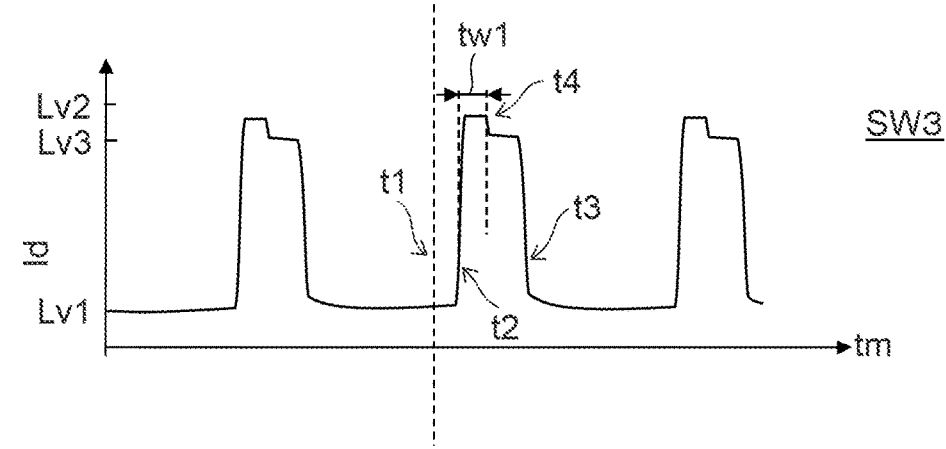

FIGS. 7A and 7B are schematic views illustrating an operation of the magnetic recording device according to the first embodiment.

These figures show another example of the element current Id. In these figures, the horizontal axis is the time tm. The vertical axis of FIG. 7A is the coil current Iw. The vertical axis of FIG. 7B is the element current Id.

As shown in FIG. 7A, the polarity of the coil current Iw changes at the first time t1. In the example shown in FIG. 7B as well, the second circuit 52 sets the element current Id to the first value Lv1 before the second time t2. The second circuit 52 sets the element current Id to the second value Lv2 at the second time t2. The element current Id is changed to the third value Lv3 at the fourth time t4 that is after the second time t2 and before the third time t3. The element current Id is changed toward the first value Lv1 at the third time t3. The third value Lv3 is between the first value Lv1 and the second value Lv2.

For the waveform illustrated in FIG. 7B as well, more effective control of the magnetization is made possible by the controller 54 controlling at least one of the second time t2, the third time t3, the fourth time t4, the first value Lv1, the second value Lv2, or the third value Lv3.

Figure 8:
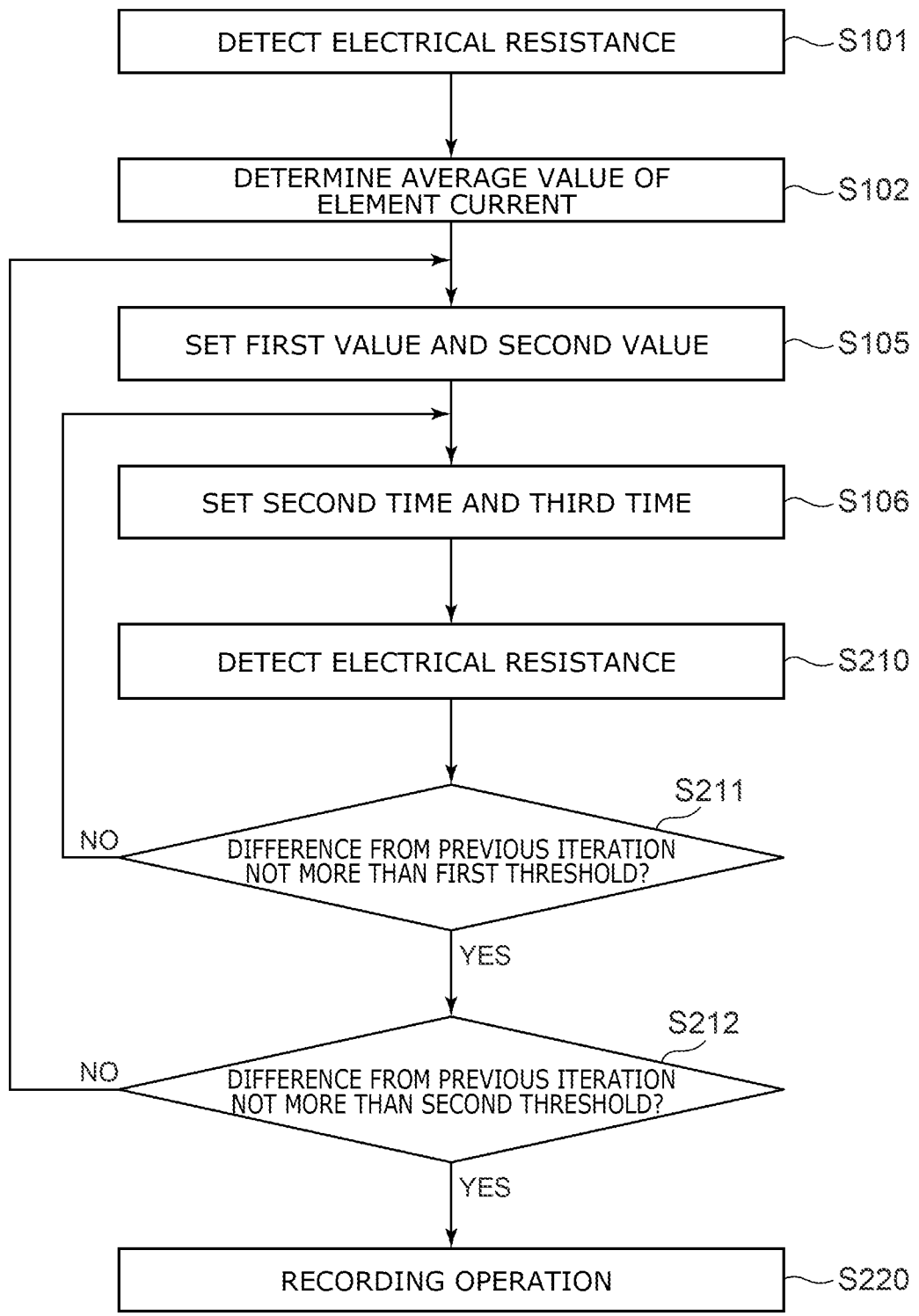
FIG. 8 is a flowchart illustrating an operation of the magnetic recording device according to the first embodiment.

FIG. 8 is a flowchart illustrating an operation of the magnetic recording device according to the first embodiment.

FIG. 8 shows an example of the operation of the controller 54 and the operations of the second and third circuits 52 and 53 performed by the control of the controller 54.

As shown in FIG. 8, the third circuit 53 detects the electrical resistance Rx of the magnetic element 20 (step S101). The controller 54 determines the average value Id_ave of the element current Id (step S102).

The controller 54 sets the first and second values Lv1 and Lv2 of the element current Id (step S105). The controller 54 may further set the third value Lv3.

The controller 54 sets the second time t2 and the third time t3 (step S106). The controller 54 may further set the fourth time t4. The controller 54 may further set the fifth time t5.

The third circuit 53 detects the electrical resistance Rx for the second element current Id that has the set values and times (step S210).

The controller 54 determines whether or not the difference between the detected electrical resistance Rx and the detected value of the previous iteration (the electrical resistance Rx detected in the previous iteration) is not more than a set value (a first threshold) (step S211). When the difference is not more than the first threshold, the flow returns to step S106. The second time t2 and the third time t3 are updated in step S106. In the update, the second time t2 and the third time t3 are set to increase the electrical resistance Rx while maintaining the determined average value Id_ave of the element current Id. Steps S210 and S211 are repeated.

The flow proceeds to step S212 when the difference is not more than the first threshold in step S211. Step S212 determines whether or not the difference between the detected electrical resistance Rx and the detected value of the previous iteration (the electrical resistance Rx detected in the previous iteration) is not more than a set value (a second threshold). When the difference is not more than the second threshold, the flow returns to step S105. The values of the first value Lv1, the second value Lv2, etc., are updated in step S105. In the update, the first value Lv1, the second value Lv2, etc., are set to increase the electrical resistance Rx while maintaining the determined average value Id_ave of the element current Id. Steps S106 to S212 are repeated.

When the difference is not more than the second threshold in step S212, the electrical resistance Rx is substantially highest at those "values" and "times". For example, a recording operation is performed by the element current Id that has such "values" and "times" (step S220). In the recording operation, the recording magnetic field efficiently acts on the magnetic recording medium 80. For example, a high recording density is obtained. A magnetic recording device can be provided in which the recording capacity can be improved.

In FIG. 8, the "times" may be set in step S105; and the "values" may be set in step S106.

Examples of the magnetic head 110 of the magnetic recording device 210 according to the embodiment will now be described.

Figure 9A:
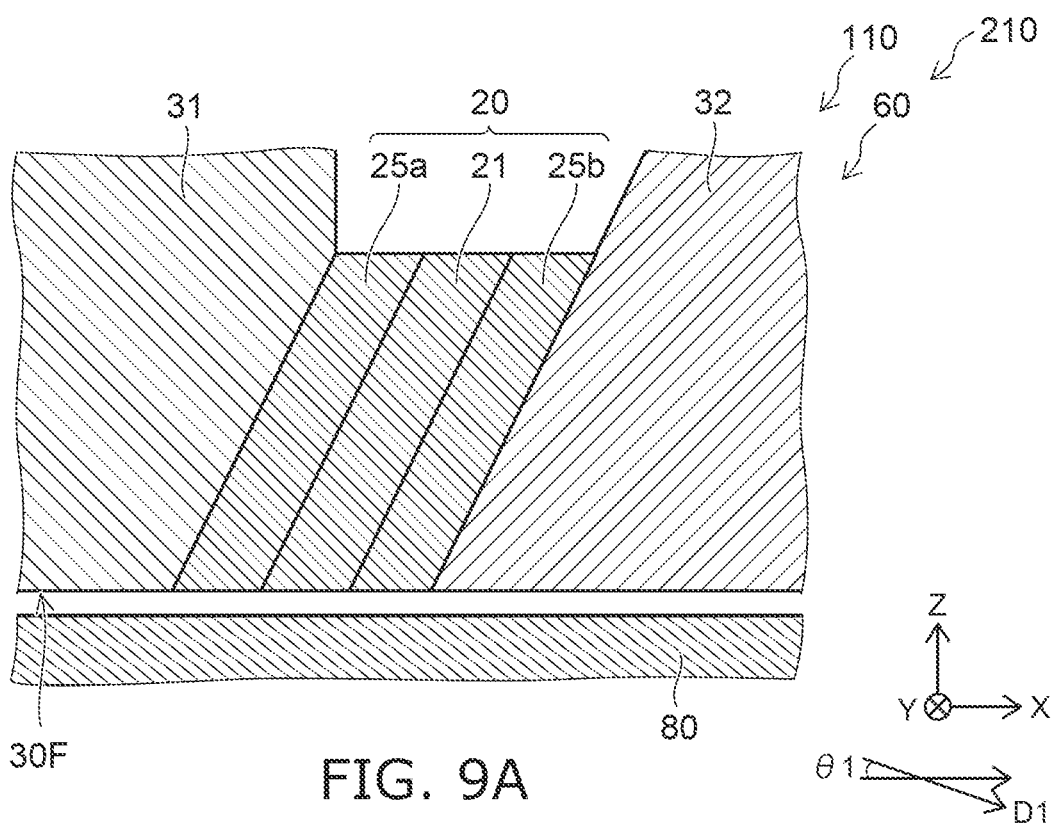
FIGS. 9A and 9B are schematic cross-sectional views illustrating portions of magnetic recording devices according to the first embodiment.
Figure 9B:
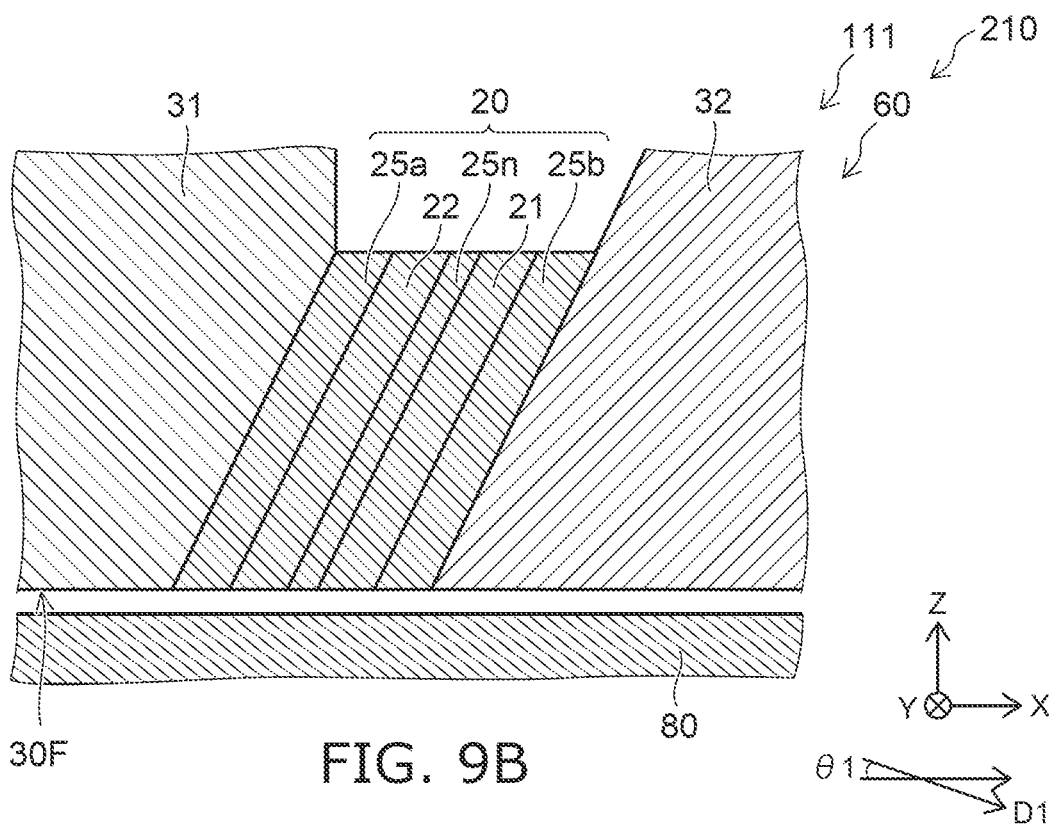

FIGS. 9A and 9B are schematic cross-sectional views illustrating portions of magnetic recording devices according to the first embodiment.

In the magnetic head 110 as shown in FIG. 9A, the magnetic element 20 may include a first magnetic pole-side nonmagnetic layer 25a and a second magnetic pole-side nonmagnetic layer 25b in addition to the first magnetic layer 21. The first magnetic pole-side nonmagnetic layer 25a is located between the first magnetic pole 31 and the first magnetic layer 21. The second magnetic pole-side nonmagnetic layer 25b is located between the first magnetic layer 21 and the second magnetic pole 32.

In one example, the first magnetic pole-side nonmagnetic layer 25a includes the first material; and the second magnetic pole-side nonmagnetic layer 25b includes the second material. The first material includes, for example, at least one selected from the group consisting of Ta, Pt, W, Ir, Mo, Cr, Tb, Mn, and Ni. The second material includes, for example, at least one selected from the group consisting of Cu, Ag, Au, Cr, and Ru. In such a case, when the element current Id has the first value Lv1, the element current Id has a first orientation from the second magnetic pole 32 toward the first magnetic pole 31. An appropriate magnetization reversal is obtained.

In another example, the first magnetic pole-side nonmagnetic layer 25a may include the second material described above; and the second magnetic pole-side nonmagnetic layer 25b may include the first material described above. In such a case, when the element current Id has the first value Lv1, the element current Id has a second orientation from the first magnetic pole toward the second magnetic pole 32. An appropriate magnetization reversal is obtained.

The controller 54 may not be provided in the magnetic recording device 210 that includes the magnetic head 110. For example, the conditions of the element current Id may be set to increase the electrical resistance Rx. In such a case, the magnetic recording device 210 includes the magnetic head 110, the first circuit 51 that is configured to supply the coil current Iw to the coil 30c, and the second circuit 52 that is configured to supply the element current Id to the magnetic element 20. The polarity of the coil current Iw changes at the first time t1. The second circuit 52 changes the element current Id to the first value Lv1 before the second time t2; and at the second time t2, the second circuit 52 changes the element current Id to the second value Lv2 that is different from the first value Lv1. The element current Id is changed to the first value Lv1 at the third time t3 that is after the second time t2. It is favorable for the second time t2 to be after the first time t1.

In the operations described above, the second circuit 52 may change the element current Id to the third value Lv3 that is different from the first value Lv1 and different from the second value Lv2 at the fourth time t4 before the second time t2 (referring to FIG. 3C). The second circuit 52 may change the element current Id toward the second value Lv2 at the fifth time t5 that is after the fourth time t4 and at or before the second time t2 (referring to FIG. 3C). For example, the first value Lv1 is between the third value Lv3 and the second value Lv2.

In a magnetic head 111 as shown in FIG. 9B, the magnetic element 20 further includes a second magnetic layer 22 and a first nonmagnetic layer 25n in addition to the first magnetic layer 21. The second magnetic layer 22 is located between the first magnetic layer 21 and the first magnetic pole 31. The first nonmagnetic layer 25n is located between the first magnetic layer 21 and the second magnetic layer 22. In such a case, for example, the magnetic element 20 functions as a STO element.

In the magnetic head 111 as shown in FIG. 9B, the magnetic element 20 may further include the first magnetic pole-side nonmagnetic layer 25a and the second magnetic pole-side nonmagnetic layer 25b. The first magnetic pole-side nonmagnetic layer 25a is located between the first magnetic pole 31 and the second magnetic layer 22. The second magnetic pole-side nonmagnetic layer 25b is located between the first magnetic layer 21 and the second magnetic pole 32.

In the magnetic head 111, for example, the first magnetic pole-side nonmagnetic layer 25a and the second magnetic pole-side nonmagnetic layer 25b include the first material; and the first nonmagnetic layer 25n includes the second material. The first material includes, for example, at least one selected from the group consisting of Ta, Pt, W, Ir, Mo, Cr, Tb, Mn, and Ni. The second material includes, for example, at least one selected from the group consisting of Cu, Ag, Au, Cr, and Ru. The orientation of the element current Id when the element current Id has the first value Lv1 may be either the first orientation from the first magnetic pole 31 toward the second magnetic pole 32 or the second orientation from the second magnetic pole 32 toward the first magnetic pole 31. An appropriate magnetization oscillation is obtained.

The controller 54 may not be provided in the magnetic recording device 210 that includes the magnetic head 111. For example, the conditions of the element current Id may be set to increase the electrical resistance Rx. In such a case, the magnetic recording device 210 includes the magnetic head 111, the first circuit 51, and the second circuit 52. For example, the second circuit 52 supplies the element current Id illustrated in FIG. 3C to the magnetic element 20. For example, the second circuit 52 sets the element current Id to the first value Lv1 before the second time t2. The second circuit 52 changes the element current Id to the second value Lv2 at the second time t2. The second circuit 52 changes the element current Id to the first value Lv1 at the third time t3 after the second time t2. The second circuit 52 changes the element current Id to the third value Lv3 that is different from the first value Lv1 and different from the second value Lv2 at the fourth time t4 before the second time t2. The second circuit 52 changes the element current Id toward the second value Lv2 at the fifth time t5 that is after the fourth time t4 and at or before the second time t2.

As shown in FIGS. 9A and 9B, a direction D1 from the first magnetic pole 31 toward the second magnetic pole 32 may be oblique to the X-axis direction. The direction D1 corresponds to the stacking direction of the magnetic element 20. The X-axis direction is along the magnetic pole surface 30F of the first magnetic pole 31. The angle between the direction D1 and the magnetic pole surface 30F is taken as an angle $\theta 1$. The angle $\theta 1$ is, for example, not less than 15 degrees and not more than 30 degrees. The angle $\theta 1$ may be 0 degrees.

Second Embodiment

A second embodiment relates to a magnetic recording method. The magnetic head 110 will now be described. The magnetic recording method is applicable to the magnetic head 111.

Figure 10:
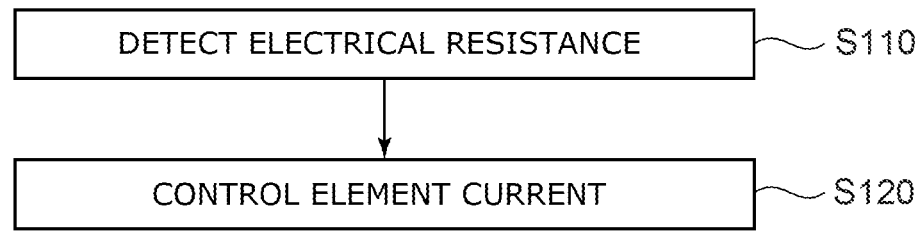
FIG. 10 is a flowchart illustrating a magnetic recording method according to a second embodiment.

FIG. 10 is a flowchart illustrating a magnetic recording method according to a second embodiment.

In the magnetic recording method according to the embodiment as shown in FIG. 10, the electrical resistance Rx of the magnetic element 20 is detected (step S110). The magnetic element 20 is included in the magnetic head 110 that includes the first magnetic pole 31, the second magnetic pole 32, the magnetic element 20, and the coil 30c. The magnetic element 20 is located between the first magnetic pole 31 and the second magnetic pole 32. The magnetic element 20 includes the first magnetic layer 21. The detection may include supplying the coil current Iw to the coil 30c and supplying the element current Id to the magnetic element 20. The detection may include, for example, calculating the average value of a cumulative sum of the electrical signal SigR obtained from the magnetic element 20. For example, the average value corresponds to the electrical resistance Rx.

In the magnetic recording method as shown in FIG. 10, the element current Id is controlled based on the result of detecting the electrical resistance Rx of the magnetic element 20 (step S120). For example, the element current Id is controlled to increase the electrical resistance Rx. A magnetic recording method can be provided in which the recording capacity can be improved.

As described with reference to FIG. 3A, the polarity of the coil current Iw changes at the first time t1. As described with reference to FIG. 3B, the element current Id is set to the first value Lv1 before the second time t2. The element current Id is changed to the second value Lv2 that is different from the first value Lv1 at the second time t2. The element current Id is changed to the first value Lv1 at the third time t3 after the second time t2. At least one of the second time t2, the third time t3, the first value Lv1, or the second value Lv2 is controlled based on the result of detecting the electrical resistance Rx of the magnetic element 20.

The element current Id described with reference to FIG. 3C may be used. For example, the element current Id is changed to the third value Lv3 that is different from the first value Lv1 and different from the second value Lv2 at the fourth time t4 before the second time t2. The element current Id is changed toward the second value Lv2 at the fifth time t5 that is after the fourth time t4 and at or before the second time t2. At least one of the second time t2, the third time t3, the fourth time t4, the fifth time t5, the first value Lv1, the second value Lv2, or the third value Lv3 is controlled based on the detected electrical resistance Rx.

For example, the first value Lv1 is between the third value Lv3 and the second value Lv2. For example, the absolute value of the difference between the first value Lv1 and the second value Lv2 is greater than the absolute value of the difference between the first value Lv1 and the third value Lv3. For example, the first value Lv1 is one of positive or negative. The second value Lv2 is the other of positive or negative. For example, the second time t2 may be practically the time at which the polarity of the element current Id changes. The third time t3 may be practically the time at which the polarity of the element current Id changes.

In the magnetic recording method, for example, the coil current Iw is an alternating current that includes the first frequency f1. The detection of the electrical resistance Rx of the magnetic element 20 may include detecting the electrical signal SigR obtained from the magnetic element 20. The electrical signal SigR includes, for example, the second frequency that is 2 times the first frequency f1. For example, the electrical resistance Rx corresponds to the temporal average of the electrical signal SigR.

The element current Id illustrated in FIG. 7B may be applied to the magnetic recording method according to the embodiment.

Figure 11:
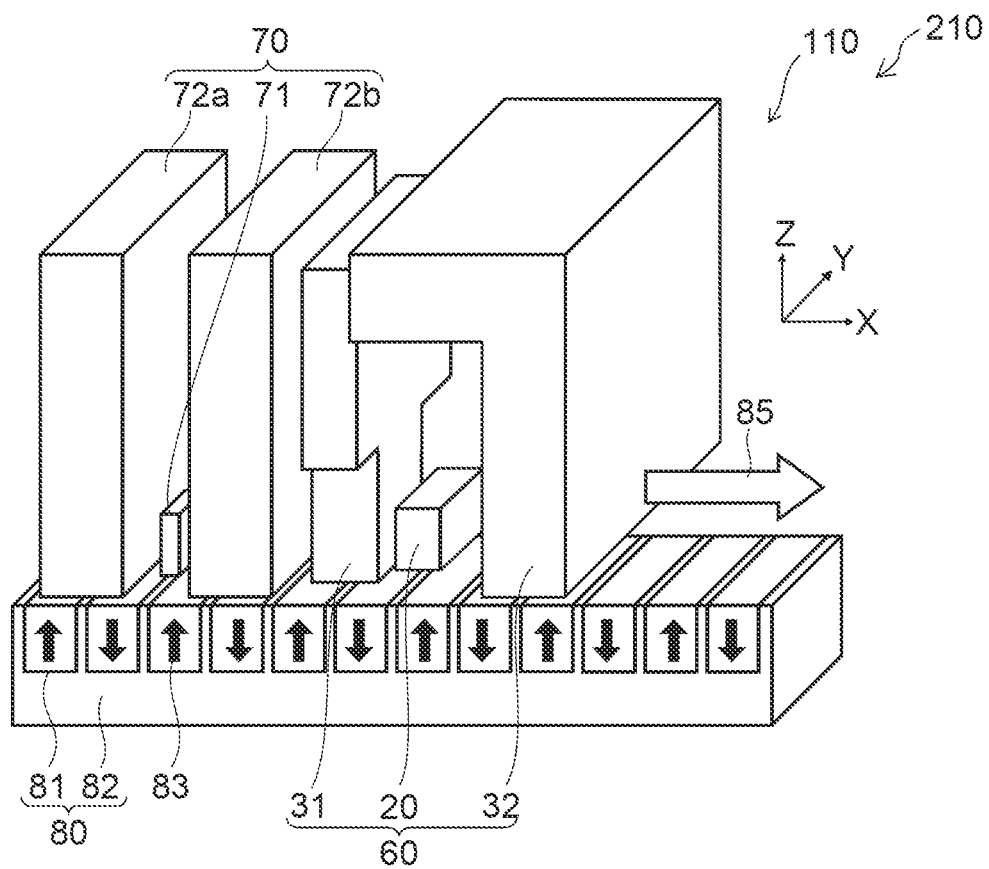
FIG. 11 is a schematic perspective view illustrating the magnetic recording device according to the embodiment.

FIG. 11 is a schematic perspective view illustrating the magnetic recording device according to the embodiment.

As shown in FIG. 11, the magnetic head (e.g., the magnetic head 110) according to the embodiment is used with the magnetic recording medium 80. In the example, the magnetic head 110 includes the recording part 60 and a reproducing part 70. Information is recorded in the magnetic recording medium 80 by the recording part 60 of the magnetic head 110. The information that is recorded in the magnetic recording medium 80 is reproduced by the reproducing part 70.

The magnetic recording medium 80 includes, for example, a medium substrate 82, and a magnetic recording layer 81 located on the medium substrate 82. A magnetization 83 of the magnetic recording layer 81 is controlled by the recording part 60.

The reproducing part 70 includes, for example, a first reproduction magnetic shield 72a, a second reproduction magnetic shield 72b, and a magnetic reproducing element 71. The magnetic reproducing element 71 is located between the first reproduction magnetic shield 72a and the second reproduction magnetic shield 72b. The magnetic reproducing element 71 is configured to output a signal corresponding to the magnetization 83 of the magnetic recording layer 81.

As shown in FIG. 11, the magnetic recording medium 80 moves relative to the magnetic head 110 in a medium movement direction 85. The information that corresponds to the magnetization 83 of the magnetic recording layer 81 is controlled by the magnetic head 110 at any position. The information that corresponds to the magnetization 83 of the magnetic recording layer 81 is reproduced by the magnetic head 110 at any position.

An example of the magnetic recording device according to the embodiment will now be described.

Figure 12:
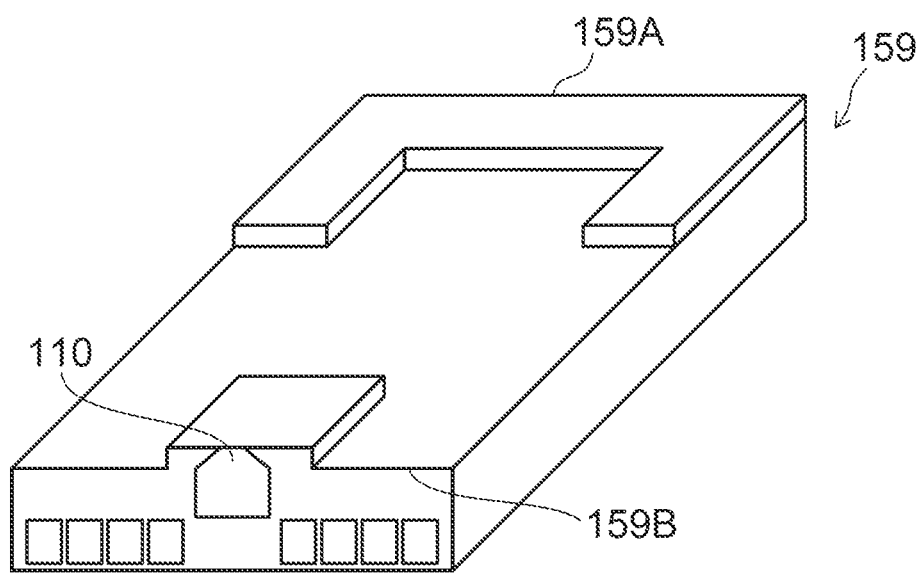
FIG. 12 is a schematic perspective view illustrating a portion of the magnetic recording device according to the embodiment.

FIG. 12 is a schematic perspective view illustrating a portion of the magnetic recording device according to the embodiment.

FIG. 12 illustrates a head slider.

The magnetic head 110 (or the magnetic head 111) is provided in the head slider 159. The head slider 159 includes, for example, $Al_2O_3$/TiC, etc. The head slider 159 moves relative to the magnetic recording medium while flying over or contacting the magnetic recording medium.

The head slider 159 has, for example, an air inflow side 159A and an air outflow side 159B. The magnetic head 110 is located at the side surface of the air outflow side 159B of the head slider 159, etc. Thereby, the magnetic head 110 moves relative to the magnetic recording medium while flying over or contacting the magnetic recording medium.

Figure 13:
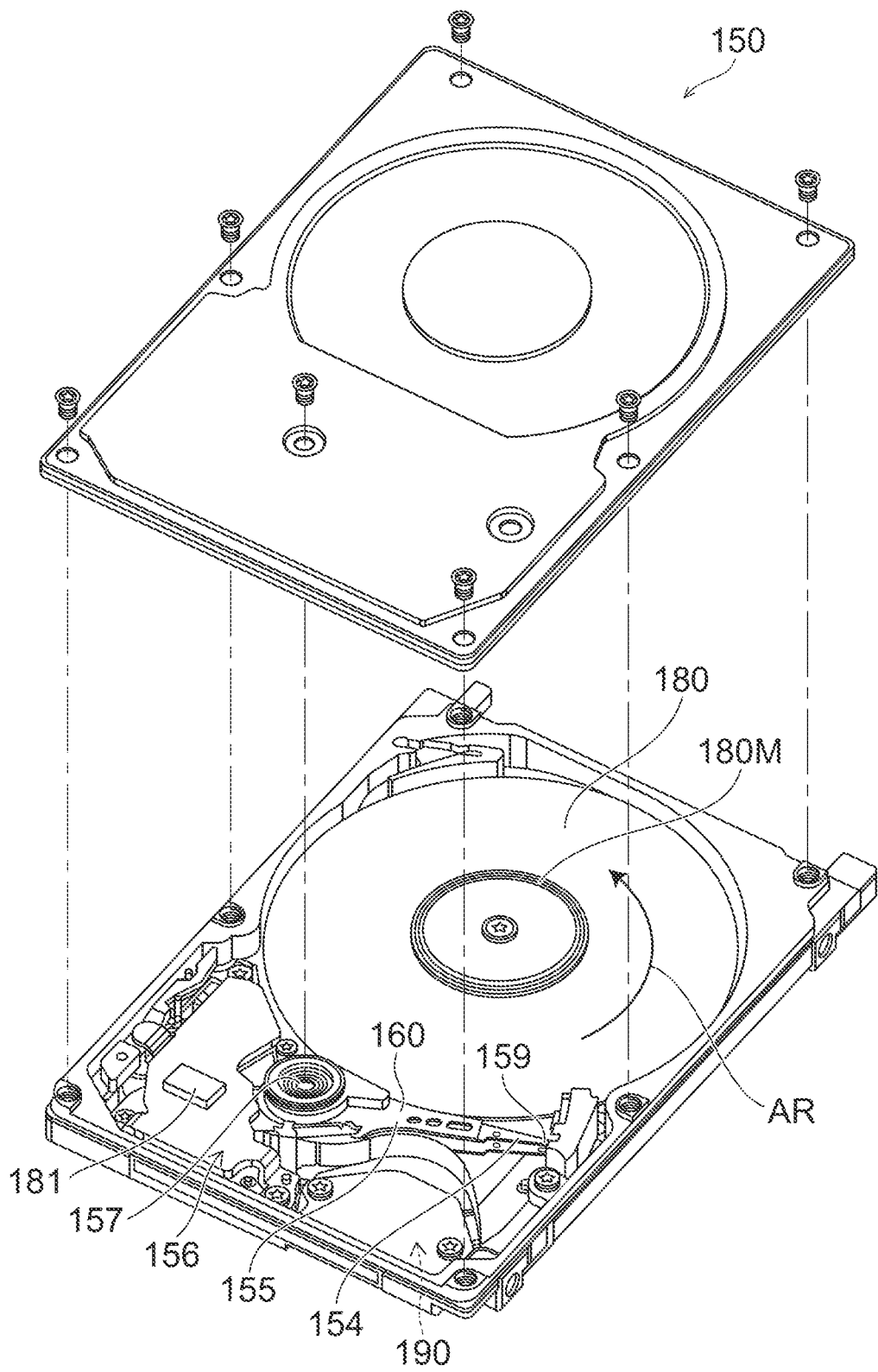
FIG. 13 is a schematic perspective view illustrating the magnetic recording device according to the embodiment.

FIG. 13 is a schematic perspective view illustrating the magnetic recording device according to the embodiment.

As shown in FIG. 13, a rotary actuator is used in the magnetic recording device 150 according to the embodiment. A recording medium disk 180 is mounted to a spindle motor 180M. The recording medium disk 180 is rotated in the direction of arrow AR by the spindle motor 180M. The spindle motor 180M responds to a control signal from a drive device controller. The magnetic recording device 150 according to the embodiment may include multiple recording medium disks 180. The magnetic recording device 150 may include a recording medium 181. The recording medium 181 is, for example, an SSD (Solid State Drive). The recording medium 181 includes, for example, nonvolatile memory such as flash memory, etc. For example, the magnetic recording device 150 may be a hybrid HDD (Hard Disk Drive).

The head slider 159 records and reproduces the information recorded in the recording medium disk 180. The head slider 159 is located at the tip of a suspension 154 having a thin-film configuration. The magnetic head according to the embodiment is located at the tip vicinity of the head slider 159.

When the recording medium disk 180 rotates, the downward pressure due to the suspension 154 and the pressure generated by the medium-facing surface (the ABS) of the head slider 159 are balanced. The distance between the medium-facing surface of the head slider 159 and the surface of the recording medium disk 180 becomes a prescribed fly height. According to the embodiment, the head slider 159 may contact the recording medium disk 180. For example, contact-sliding is applicable.

The suspension 154 is connected to one end of an arm 155 (e.g., an actuator arm). The arm 155 includes, for example, a bobbin part, etc. The bobbin part holds a drive coil. A voice coil motor 156 is located at the other end of the arm 155. The voice coil motor 156 is one type of linear motor. The voice coil motor 156 includes, for example, a drive coil and a magnetic circuit. The drive coil is wound onto the bobbin part of the arm 155. The magnetic circuit includes a permanent magnet and an opposing yoke. The drive coil is located between the permanent magnet and the opposing yoke. The suspension 154 includes one end and another end. The magnetic head is located at the one end of the suspension 154. The arm 155 is connected to the other end of the suspension 154.

The arm 155 is held by ball bearings. The ball bearings are located at two locations above and below a bearing part 157. The arm 155 can rotate and slide due to the voice coil motor 156. The magnetic head is movable to any position of the recording medium disk 180.

Figure 14A:
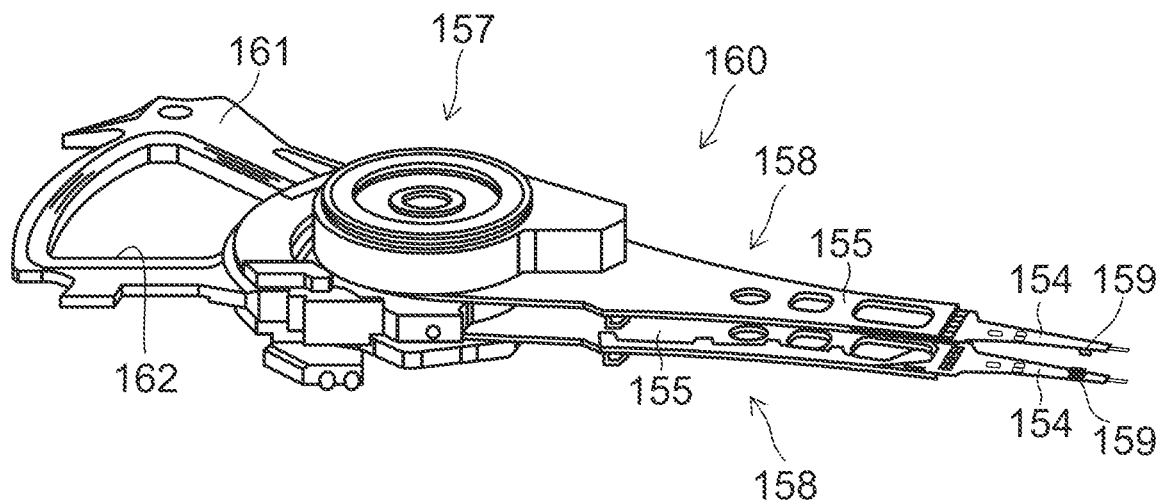
FIGS. 14A and 14B are schematic perspective views illustrating a portion of the magnetic recording device according to the embodiment.
Figure 14B:
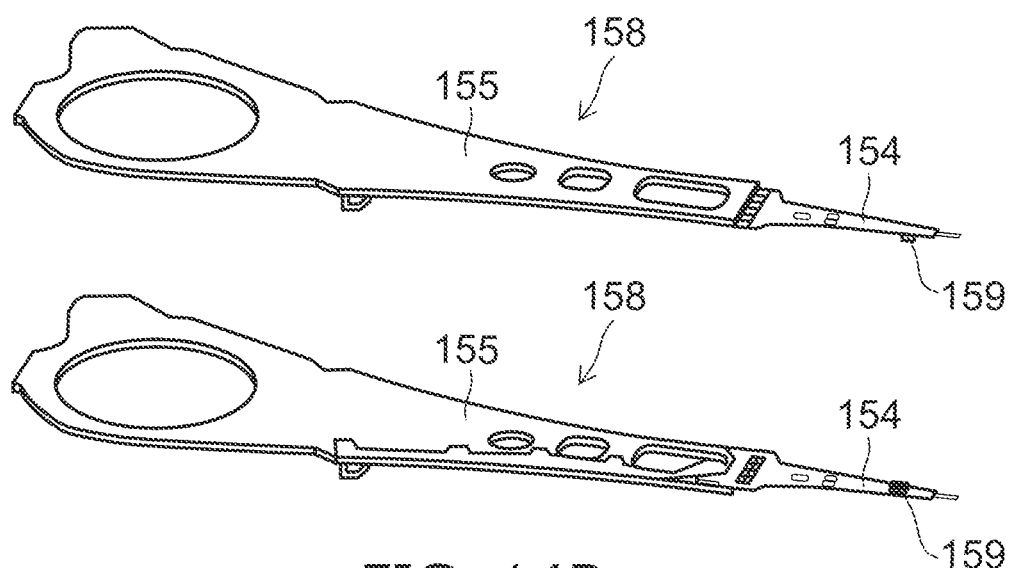

FIGS. 14A and 14B are schematic perspective views illustrating a portion of the magnetic recording device according to the embodiment.

FIG. 14A illustrates the configuration of a portion of the magnetic recording device and is an enlarged perspective view of a head stack assembly 160. FIG. 14B is a perspective view illustrating a magnetic head assembly (a head gimbal assembly (HGA)) 158 that is a portion of the head stack assembly 160.

As shown in FIG. 14A, the head stack assembly 160 includes the bearing part 157, the head gimbal assembly 158, and a support frame 161. The head gimbal assembly 158 extends from the bearing part 157. The support frame 161 extends from the bearing part 157. The direction in which the support frame 161 extends is opposite to the direction in which the head gimbal assembly 158 extends. The support frame 161 supports a coil 162 of the voice coil motor 156.

As shown in FIG. 14B, the head gimbal assembly 158 includes the arm 155 that extends from the bearing part 157, and the suspension 154 that extends from the arm 155.

The head slider 159 is located at the tip of the suspension 154. The magnetic head according to the embodiment is provided in the head slider 159.

The magnetic head assembly (the head gimbal assembly) 158 according to the embodiment includes the magnetic head according to the embodiment, the head slider 159 in which the magnetic head is provided, the suspension 154, and the arm 155. The head slider 159 is located at one end of the suspension 154. The arm 155 is connected with the other end of the suspension 154.

The suspension 154 includes, for example, lead wires (not illustrated) for recording and reproducing signals. The suspension 154 may include, for example, lead wires (not illustrated) for a heater that regulates the fly height. The suspension 154 may include, for example, lead wires (not illustrated) for a spin torque oscillator, etc. These lead wires are electrically connected to multiple electrodes provided in the magnetic head.

A signal processor 190 is provided in the magnetic recording device 150. The signal processor 190 records and reproduces the signals to and from the magnetic recording medium by using the magnetic head. For example, the signal processor 190 is electrically connected with the magnetic head by the input/output lines of the signal processor 190 being connected to electrode pads of the head gimbal assembly 158.

The magnetic recording device 150 according to the embodiment includes a magnetic recording medium, the magnetic head according to the embodiment, a movable part, a position controller, and a signal processor. The movable part causes the magnetic recording medium and the magnetic head to separate or causes the magnetic recording medium and the magnetic head to be movable relative to each other in a state of contact. The position controller aligns the magnetic head at a prescribed recording position of the magnetic recording medium. The signal processor records and reproduces the signals to and from the magnetic recording medium by using the magnetic head.

For example, the recording medium disk 180 is used as the magnetic recording medium described above. The movable part described above includes, for example, the head slider 159. The position controller described above includes, for example, the head gimbal assembly 158.

The magnetic recording device 150 according to the embodiment includes a magnetic recording medium, the magnetic head assembly according to the embodiment, and a signal processor that records and reproduces the signals to and from the magnetic recording medium by using the magnetic head provided in the magnetic head assembly.

Embodiments may include the following configurations (e.g., technological proposals).

Configuration 1

A magnetic recording device, comprising:

a magnetic head including a first magnetic pole, a second magnetic pole, a magnetic element, and a coil, the magnetic element being located between the first magnetic pole and the second magnetic pole, the magnetic element including a first magnetic layer;

a first circuit configured to supply a coil current to the coil;

a second circuit configured to supply an element current to the magnetic element;

a third circuit configured to detect an electrical resistance of the magnetic element; and a controller configured to control the element current by controlling the second circuit based on the electrical resistance detected by the third circuit.

Configuration 2

The magnetic recording device according to Configuration 1, wherein the controller can control a value of the element current by controlling the second circuit based on the electrical resistance detected by the third circuit.

Configuration 3

The magnetic recording device according to Configuration 1, wherein a polarity of the coil current changes at a first time in a first operation, in the first operation, the second circuit sets the element current to a first value before a second time, in the first operation, the second circuit changes the element current to a second value at the second time, the second value being different from the first value, in the first operation, the second circuit changes the element current to the first value at a third time after the second time, and in the first operation, the controller can control at least one of the second time, the third time, the first value, or the second value by controlling the second circuit based on the electrical resistance detected by the third circuit.

Configuration 4

The magnetic recording device according to Configuration 3, wherein in the first operation, the second circuit changes the element current to a third value at a fourth time before the second time, the third value being different from the first value and different from the second value, in the first operation, the second circuit changes the element current toward the second value at a fifth time, the fifth time being after the fourth time and at or before the second time, and in the first operation, the controller can control at least one of the second time, the third time, the fourth time, the fifth time, the first value, the second value, or the third value by controlling the second circuit based on the electrical resistance detected by the third circuit.

Configuration 5

The magnetic recording device according to Configuration 4, wherein the first value is between the third value and the second value.

Configuration 6

The magnetic recording device according to Configuration 5, wherein an absolute value of a difference between the first value and the second value is greater than an absolute value of a difference between the first value and the third value.

Configuration 7

The magnetic recording device according to any one of Configurations 1 to 6, wherein the magnetic element further includes:

a first magnetic pole-side nonmagnetic layer located between the first magnetic pole and the first magnetic layer; and a second magnetic pole-side nonmagnetic layer located between the first magnetic layer and the second magnetic pole.

Configuration 8

The magnetic recording device according to Configuration 7, wherein in the case where the first magnetic pole-side nonmagnetic layer includes a first material, and the second magnetic pole-side nonmagnetic layer includes a second material, the element current has a first orientation from the second magnetic pole toward the first magnetic pole when the element current has the first value, the first material includes at least one selected from the group consisting of Ta, Pt, W, Ir, Mo, Cr, Tb, Mn, and Ni, the second material includes at least one selected from the group consisting of Cu, Ag, Au, Cr, and Ru, and in the case where the first magnetic pole-side nonmagnetic layer includes the second material, and the second magnetic pole-side nonmagnetic layer includes the first material, the element current has a second orientation from the first magnetic pole toward the second magnetic pole when the element current has the first value.

Configuration 9

The magnetic recording device according to any one of Configurations 1 to 8, wherein the coil current is an alternating current that includes a first frequency, the third circuit detects an electrical signal obtained from the magnetic element, the electrical signal includes a second frequency that is 2 times the first frequency, and the electrical resistance corresponds to a temporal average of the electrical signal.

Configuration 10

A magnetic recording device, comprising:

a magnetic head including a first magnetic pole, a second magnetic pole, a magnetic element, and a coil, the magnetic element being located between the first magnetic pole and the second magnetic pole, the magnetic element including a first magnetic layer, a first magnetic pole-side nonmagnetic layer located between the first magnetic pole and the first magnetic layer, and a second magnetic pole-side nonmagnetic layer located between the first magnetic layer and the second magnetic pole, the first magnetic pole-side nonmagnetic layer including one of a first material or a second material, the second magnetic pole-side nonmagnetic layer including the other of the first material or the second material, the first material including at least one selected from the group consisting of Ta, Pt, W, Ir, Mo, Cr, Tb, Mn, and Ni, the second material including at least one selected from the group consisting of Cu, Ag, Au, Cr, and Ru;

a first circuit configured to supply a coil current to the coil; and a second circuit configured to supply an element current to the magnetic element, a polarity of the coil current changing at a first time, the second circuit setting the element current to a first value before a second time, the second circuit changing the element current to a second value at the second time, the second value being different from the first value, the second circuit changing the element current to the first value at a third timed after the second time.

Configuration 11

The magnetic recording device according to Configuration 10, wherein in the case where the first magnetic pole-side nonmagnetic layer includes the first material, and the second magnetic pole-side nonmagnetic layer includes the second material, the element current has a first orientation from the second magnetic pole toward the first magnetic pole when the element current has the first value, and in the case where the first magnetic pole-side nonmagnetic layer includes the second material, and the second magnetic pole-side nonmagnetic layer includes the first material, the element current has a second orientation from the first magnetic pole toward the second magnetic pole when the element current has the first value.

Configuration 12

The magnetic recording device according to Configuration 10 or 11, wherein
the second circuit changes the element current to a third value at a fourth time before the second time,
the third value is different from the first value and different from the second value, and
the second circuit changes the element current toward the second value at a fifth time after the fourth time and at or before the second time.

Configuration 13

The magnetic recording device according to Configuration 12, wherein
the first value is between the third value and the second value.

Configuration 14

The magnetic recording device according to Configuration 13, wherein
an absolute value of a difference between the first value and the second value is greater than an absolute value of a difference between the first value and the third value.

Configuration 15

A magnetic recording device, comprising:
a magnetic head including a first magnetic pole, a second magnetic pole, a magnetic element, and a coil,
the magnetic element being located between the first magnetic pole and the second magnetic pole,
the magnetic element including
a first magnetic layer,
a second magnetic layer located between the first magnetic layer and the first magnetic pole,
a first nonmagnetic layer located between the first magnetic layer and the second magnetic layer,
a first magnetic pole-side nonmagnetic layer located between the first magnetic pole and the second magnetic layer, and
a second magnetic pole-side nonmagnetic layer located between the first magnetic layer and the second magnetic pole;
a first circuit configured to supply a coil current to the coil; and
a second circuit configured to supply an element current to the magnetic element,
a polarity of the coil current changing at a first time,
the second circuit setting the element current to a first value before a second time,
the second circuit changing the element current to a second value at the second time,
the second value being different from the first value,
the second circuit changing the element current to the first value at a third time after the second time,
the second circuit changing the element current to a third value at a fourth time before the second time,
the third value being different from the first value and different from the second value,
the second circuit changing the element current toward the second value at a fifth time after the fourth time and at or before the second time.

Configuration 16

A magnetic recording method, comprising:
supplying a coil current to a coil of a magnetic head, supplying an element current to a magnetic element of the magnetic head, and detecting an electrical resistance of the magnetic element,
the magnetic head including a first magnetic pole, a second magnetic pole, the magnetic element, and the coil,
the magnetic element being located between the first magnetic pole and the second magnetic pole,
the magnetic element including a first magnetic layer; and
controlling the element current based on a result of the detecting of the electrical resistance of the magnetic element.

Configuration 17

The magnetic recording method according to Configuration 16, wherein
a polarity of the coil current changes at a first time,
the element current is set to a first value before a second time,
the element current is changed to a second value at the second time,
the second value is different from the first value,
the element current is changed to the first value at a third time after the second time, and
at least one of the second time, the third time, the first value, or the second value is controlled based on the result of the detecting of the electrical resistance of the magnetic element.

Configuration 18

The magnetic recording method according to Configuration 17, wherein
the element current is changed to a third value at a fourth time before the second time,
the third value is different from the first value and different from the second value,
the element current is changed toward the second value at a fifth time after the fourth time and at or before the second time, and
at least one of the second time, the third time, the fourth time, the fifth time, the first value, the second value, or the third value is controlled based on the detected electrical resistance.

Configuration 19

The magnetic recording method according to Configuration 18, wherein the first value is between the third value and the second value.

Configuration 20

The magnetic recording method according to Configuration 18 or 19, wherein
the coil current is an alternating current including a first frequency,
the detecting of the electrical resistance of the magnetic element includes detecting an electrical signal obtained from the magnetic element,
the electrical signal includes a second frequency that is 2 times the first frequency, and
the electrical resistance corresponds to a temporal average of the electrical signal.

According to embodiments, a magnetic recording device and a magnetic recording method can be provided in which the recording capacity can be improved.

In the specification of the application, "perpendicular" and "parallel" refer to not only strictly perpendicular and strictly parallel but also include, for example, the fluctuation due to manufacturing processes, etc. It is sufficient to be substantially perpendicular and substantially parallel.

Hereinabove, exemplary embodiments of the invention are described with reference to specific examples. However, the embodiments of the invention are not limited to these specific examples. For example, one skilled in the art may similarly practice the invention by appropriately selecting specific configurations of components included in magnetic recording devices such as magnetic heads, magnetic poles, shields, magnetic elements, magnetic layers, nonmagnetic layers, wirings, circuits, controllers, etc., from known art. Such practice is included in the scope of the invention to the extent that similar effects thereto are obtained.

Further, any two or more components of the specific examples may be combined within the extent of technical feasibility and are included in the scope of the invention to the extent that the purport of the invention is included.

Moreover, all magnetic recording devices, and magnetic recording methods practicable by an appropriate design modification by one skilled in the art based on the magnetic recording devices, and the magnetic recording methods described above as embodiments of the invention also are within the scope of the invention to the extent that the purport of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A magnetic recording device, comprising:
   a magnetic head including a first magnetic pole, a second magnetic pole, a magnetic element, and a coil, the magnetic element being located between the first magnetic pole and the second magnetic pole, the magnetic element including a first magnetic layer;
   a first circuit configured to supply a coil current to the coil;
   a second circuit configured to supply an element current to the magnetic element;
   a third circuit configured to detect an electrical resistance of the magnetic element; and
   a controller configured to control the element current by controlling the second circuit based on the electrical resistance detected by the third circuit,
   wherein
   a polarity of the coil current changes at a first time in a first operation,
   in the first operation, the second circuit sets the element current to a first value before a second time,
   in the first operation, the second circuit changes the element current to a second value at the second time, the second value being different from the first value,
   in the first operation, the second circuit changes the element current to the first value at a third time after the second time,
   in the first operation, the controller can control at least one of the second time, the third time, the first value, or the second value by controlling the second circuit based on the electrical resistance detected by the third circuit,
   in the first operation, the second circuit changes the element current to a third value at a fourth time before the second time, the third value being different from the first value and different from the second value,
   in the first operation, the second circuit changes the element current toward the second value at a fifth time, the fifth time being after the fourth time and at or before the second time, and
   in the first operation, the controller can control at least one of the second time, the third time, the fourth time, the fifth time, the first value, the second value, or the third value by controlling the second circuit based on the electrical resistance detected by the third circuit.

2. The device according to claim 1, wherein the first value is between the third value and the second value.

3. The device according to claim 2, wherein an absolute value of a difference between the first value and the second value is greater than an absolute value of a difference between the first value and the third value.

4. The device according to claim 1, wherein the magnetic element further includes:
   a first magnetic pole-side nonmagnetic layer located between the first magnetic pole and the first magnetic layer; and
   a second magnetic pole-side nonmagnetic layer located between the first magnetic layer and the second magnetic pole.

5. The device according to claim 4, wherein
   in the case where the first magnetic pole-side nonmagnetic layer includes a first material, and the second magnetic pole-side nonmagnetic layer includes a second material, the element current has a first orientation from the second magnetic pole toward the first magnetic pole when the element current has the first value,
   the first material includes at least one selected from the group consisting of Ta, Pt, W, Ir, Mo, Cr, Tb, Mn, and Ni,
   the second material includes at least one selected from the group consisting of Cu, Ag, Au, Cr, and Ru, and
   in the case where the first magnetic pole-side nonmagnetic layer includes the second material, and the second magnetic pole-side nonmagnetic layer includes the first material, the element current has a second orientation from the first magnetic pole toward the second magnetic pole when the element current has the first value.

6. A magnetic recording device, comprising:
   a magnetic head including a first magnetic pole, a second magnetic pole, a magnetic element, and a coil, the magnetic element being located between the first magnetic pole and the second magnetic pole, the magnetic element including a first magnetic layer;
   a first circuit configured to supply a coil current to the coil;
   a second circuit configured to supply an element current to the magnetic element;
   a third circuit configured to detect an electrical resistance of the magnetic element; and
   a controller configured to control the element current by controlling the second circuit based on the electrical resistance detected by the third circuit,
   wherein the coil current is an alternating current that includes a first frequency, the third circuit detects an electrical signal obtained from the magnetic element, the electrical signal includes a second frequency that is 2 times the first frequency, and the electrical resistance corresponds to a temporal average of the electrical signal.

7. A magnetic recording device, comprising:

a magnetic head including a first magnetic pole, a second magnetic pole, a magnetic element, and a coil, the magnetic element being located between the first magnetic pole and the second magnetic pole, the magnetic element including
- a first magnetic layer,
- a first magnetic pole-side nonmagnetic layer located between the first magnetic pole and the first magnetic layer, and
- a second magnetic pole-side nonmagnetic layer located between the first magnetic layer and the second magnetic pole, the first magnetic pole-side nonmagnetic layer including one of a first material or a second material, the second magnetic pole-side nonmagnetic layer including the other of the first material or the second material, the first material including at least one selected from the group consisting of Ta, Pt, W, Ir, Mo, Cr, Tb, Mn, and Ni, the second material including at least one selected from the group consisting of Cu, Ag, Au, Cr, and Ru;

a first circuit configured to supply a coil current to the coil; and a second circuit configured to supply an element current to the magnetic element, a polarity of the coil current changing at a first time, the second circuit setting the element current to a first value before a second time, the second circuit changing the element current to a second value at the second time, the second value being different from the first value, the second circuit changing the element current to the first value at a third timed after the second time.

8. The device according to claim 7, wherein in the case where the first magnetic pole-side nonmagnetic layer includes the first material, and the second magnetic pole-side nonmagnetic layer includes the second material, the element current has a first orientation from the second magnetic pole toward the first magnetic pole when the element current has the first value, and in the case where the first magnetic pole-side nonmagnetic layer includes the second material, and the second magnetic pole-side nonmagnetic layer includes the first material, the element current has a second orientation from the first magnetic pole toward the second magnetic pole when the element current has the first value.

9. The device according to claim 7, wherein the second circuit changes the element current to a third value at a fourth time before the second time, the third value is different from the first value and different from the second value, and the second circuit changes the element current toward the second value at a fifth time after the fourth time and at or before the second time.

10. The device according to claim 9, wherein the first value is between the third value and the second value.

11. The device according to claim 10, wherein an absolute value of a difference between the first value and the second value is greater than an absolute value of a difference between the first value and the third value.

12. A magnetic recording device, comprising:

a magnetic head including a first magnetic pole, a second magnetic pole, a magnetic element, and a coil, the magnetic element being located between the first magnetic pole and the second magnetic pole, the magnetic element including
- a first magnetic layer,
- a second magnetic layer located between the first magnetic layer and the first magnetic pole,
- a first nonmagnetic layer located between the first magnetic layer and the second magnetic layer,
- a first magnetic pole-side nonmagnetic layer located between the first magnetic pole and the second magnetic layer, and
- a second magnetic pole-side nonmagnetic layer located between the first magnetic layer and the second magnetic pole;

a first circuit configured to supply a coil current to the coil; and a second circuit configured to supply an element current to the magnetic element, a polarity of the coil current changing at a first time, the second circuit setting the element current to a first value before a second time, the second circuit changing the element current to a second value at the second time, the second value being different from the first value, the second circuit changing the element current to the first value at a third time after the second time, the second circuit changing the element current to a third value at a fourth time before the second time, the third value being different from the first value and different from the second value, the second circuit changing the element current toward the second value at a fifth time after the fourth time and at or before the second time.

* * * * *